(12) United States Patent  
Grudinin et al.

(10) Patent No.: US 8,270,070 B2  
(45) Date of Patent: *Sep. 18, 2012

(54) MULTI-FIBRE ARRANGEMENT FOR HIGH POWER FIBRE LASERS AND AMPLIFIERS

(75) Inventors: Anatoly Borisovich Grudinin, Hampshire (GB); Dave Neil Payne, Hampshire (GB); Paul William Turner, Hampshire (GB); Lars Johan Albinsson Nilsson, Hampshire (GB); Michael Nickolaos Zervas, Southampton (GB); Morten Ibsen, Southampton (GB); Michael Kevan Durkin, Worcestershire (GB)

(73) Assignee: SPI Lasers UK Ltd, Southampton (GB)

(*) Notice: Subject to any disclaimer, the term of this patent is extended or adjusted under 35 U.S.C. 154(b) by 118 days.

This patent is subject to a terminal disclaimer.

(21) Appl. No.: 12/658,610

(22) Filed: Feb. 8, 2010

(65) Prior Publication Data

US 2010/0188734 A1 Jul. 29, 2010

(51) Int. Cl.
*H04B 10/17* (2006.01)
*G02B 6/245* (2006.01)
*H04B 10/12* (2006.01)

(52) U.S. Cl. .............. 359/341.3; 359/341.1; 385/30; 372/6; 372/70

(58) Field of Classification Search ........... 359/341.1, 359/341.3; 385/45, 115; 372/6, 20
See application file for complete search history.

(56) References Cited

U.S. PATENT DOCUMENTS

| | | | | |
|---|---|---|---|---|
| 4,515,431 A * | 5/1985 | Shaw et al. | | 385/30 |
| 4,553,238 A * | 11/1985 | Shaw et al. | | 372/6 |
| 4,775,209 A * | 10/1988 | Stewart | | 385/39 |
| 4,815,079 A * | 3/1989 | Snitzer et al. | | 372/6 |
| 4,997,247 A * | 3/1991 | Stowe | | 385/50 |
| 5,166,994 A * | 11/1992 | Stowe et al. | | 385/48 |
| 5,167,685 A * | 12/1992 | Fukuma et al. | | 65/411 |
| 5,373,578 A * | 12/1994 | Parker et al. | | 385/128 |
| 5,491,764 A * | 2/1996 | Hu et al. | | 385/24 |
| 5,721,635 A * | 2/1998 | Shigematsu et al. | | 359/337.3 |
| 5,742,722 A * | 4/1998 | Imoto | | 385/126 |
| 5,838,848 A * | 11/1998 | Laude | | 385/24 |
| 5,864,644 A * | 1/1999 | DiGiovanni et al. | | 385/43 |
| 5,999,673 A * | 12/1999 | Valentin et al. | | 385/43 |
| 6,052,220 A * | 4/2000 | Lawrence et al. | | 359/341.1 |
| 6,134,362 A * | 10/2000 | Au-Yeung et al. | | 385/43 |
| 6,237,370 B1 * | 5/2001 | Bloom | | 65/484 |
| 6,826,335 B1 * | 11/2004 | Grudinin et al. | | 385/43 |
| 6,959,131 B2 * | 10/2005 | Willig | | 385/43 |
| 7,221,822 B2 * | 5/2007 | Grudinin et al. | | 385/30 |
| 2002/0054740 A1 * | 5/2002 | Vakili et al. | | 385/115 |
| 2003/0164006 A1 * | 9/2003 | Buchanan et al. | | 65/407 |

* cited by examiner

*Primary Examiner* — Eric Bolda
(74) *Attorney, Agent, or Firm* — John S. Reid

(57) ABSTRACT

An optical fiber arrangement has at least two optical fiber sections, each optical fiber section defining an outside longitudinally extending surface. The outside longitudinally extending surfaces are in optical contact with each other. The invention further provides for an amplifying optical device have an optical fiber arrangement as just described, and a pump source. The amplifying optical device is configured such that the pump source illuminates the amplifying optical fiber. A amplifying arrangement is also disclosed. The amplifying arrangement includes a plurality of amplifying optical devices as just described, and each amplifier also has at least one input fiber and a first multiplexer connected to the input fiber. Each amplifier is configured such that at least one of the amplifying optical fibers is connected to the first multiplexer. The amplifying arrangement also has a second multiplexer connected to each of the first multiplexers.

21 Claims, 24 Drawing Sheets

MULTI-FIBRE ARRANGEMENT FOR HIGH POWER FIBRE LASERS AND AMPLIFIERS

CROSS REFERENCE TO RELATED APPLICATIONS

This application claims priority under 35 U.S.C. §120 to U.S. patent application Ser. No. 11/788,054, filed Apr. 19, 2007, which in turn claims priority under 35 U.S.C. §120 to U.S. patent application Ser. No. 10/999,758, filed Nov. 29, 2004, which in turn claims priority under 35 U.S.C. §120 to U.S. patent application Ser. No. 09/560,593, filed Apr. 28, 2000 (now U.S. Pat. No. 6,826,335), which in turn claims priority under 35 U.S.C. §119 to patent applications serial numbers 9910165.1, filed in the United Kingdom on Apr. 30, 1999; and 9911958.8, filed in the United Kingdom on May 21, 1999 which claims priority to United Kingdom patent application serial number 9910165.1; and 9917594.5, filed in the United Kingdom on Jul. 27, 1999. All of the foregoing applications are incorporated herein by reference in their entirety.

FIELD OF THE INVENTION

This invention relates to an optical fibre arrangement, optical fibre lasers and optical fibre amplifiers.

BACKGROUND OF THE INVENTION

There is a demand for optical amplifiers that can output powers of 1 W or greater, can amplify many wavelength channels simultaneously with low cross-talk and low inter-channel interference, and can do so with high reliability and low cost per wavelength channel.

In many applications such as dense wavelength division multiplexing (WDM) transmission systems and satellite communications, optical amplifiers and transmitters, optically pumped by, e.g., laser diodes, should not only be capable of handling relatively high power but also be protected against failure of pump sources.

Conventional optical amplifiers use single-mode optical fibre whose core is doped with one or more rare-earth ions such as Erbium. Such amplifiers provide limited power output that is insufficient for multi-channel WDM transmission systems. In addition, conventional amplifiers are prone to the failure of pump sources, requiring several pump sources to be contained with the amplifier in order to provide pump redundancy—but at high cost.

The power output of conventional optical amplifiers has recently been increased by the introduction of pump modules containing several semiconductor lasers whose outputs are wavelength division multiplexed into a single optical fibre. Although the output power obtainable from such an optical amplifier containing one of these pump modules is sufficient for amplifying many channels simultaneously, the approach is expensive, is currently limited in powers to around 1 W, and offers limited pump redundancy.

Higher-power optical amplifiers and fibre lasers can be constructed using double-clad optical fibres containing a single-mode waveguiding core doped with rare-earth ions (such as Erbium or Erbium/Ytterbium) and a multi-mode inner cladding formed by the silica cladding guiding against an outer cladding with lower refractive index. This outer cladding is typically a polymer outer cladding. However, it is cumbersome to separate the signal path to the single-mode core from the path required to launch pump powers into the inner cladding. Several techniques have been tried including separating the beams with dichroic mirrors, side pumping using a multimode coupler, and etching pits into the double-clad fibre. However, none of these techniques provides a simple, effective way of reliably introducing the pump energy into the optical amplifier or fibre laser—especially if several pump lasers are required in order to provide pump redundancy. This issue is of concern for high-power fibre lasers where there is a requirement to introduce the pump energy from several to tens of pump diodes into the laser cavity. No effective, reliable and cost-effective way to achieve this exists in the prior art.

An associated problem is that introducing signal conditioning into the optical amplifier can be difficult. For example, it is often desirable to compensate for the spectral gain variation within the optical amplifier, or to introduce a filter to compensate for the dispersion in a telecommunication link. This requires ready access to the signal, which can be difficult for most amplifier configurations. A requirement therefore exists for an amplifier and laser design where it is simple to insert added functionality.

Today's optical telecommunications networks are increasingly based on wavelength division multiplexing—the simultaneous transmission of many wavelength channels through the same fibre. As the networks expand, these wavelength channels can originate from different locations. This places stringent demands on the management of the network, especially on the performance of optical amplifiers dispersed throughout the network. The wavelength channels arriving at an optical amplifier are unlikely to have equal powers (i.e., they are unbalanced), and the power of an individual wavelength channel can be suddenly and unexpectedly increased. This unbalance and the changing of the power levels in individual channels is referred to as granularity. Prior art optical amplifiers experience problems with unbalanced wavelength channels in that the highest power wavelength channel can be amplified more than the other channels, thus increasing the unbalance. In addition, the sudden changing of the power level in one wavelength channel can cause instabilities in the optical amplifier that carry over to other channels. One of the most robust solutions to remove the granularity is to separate all the wavelength channels prior to amplification, amplify the channels, and then recombine the channels for retransmission. The major problem with this approach is that networks can transmit over one hundred wavelength channels through a single optical fibre. The cost of prior-art optical amplifiers makes this solution unattractive.

The cost issue of optical amplifiers is also a problem as the networks expand into metropolitan areas, the expansion being driven by the insatiable demand for bandwidth for internet, data, mobile phones and cable television. Prior art optical amplifiers are too expensive and this is currently limiting the expansion of the networks.

Erbium-doped fibre amplifiers have revolutionized optical telecommunications over the last ten years. They are finding more and more uses, for instance for compensation of switching losses. The increasing need for capacity in telecommunication networks drives not only amplification requirements, e.g., output power and gain flatness for wavelength division multiplexing applications, but also the required number of amplifiers in a system. Erbium doped fibre amplifiers have remained "stand-alone" devices, with individual amplifiers separately packaged. Component count as well as cost then holds back penetration of the optical amplifiers into different application areas that require a large number of amplifiers at a low cost. Instead, the drive has been towards purpose-built optical amplifiers with high specifications (bandwidth and output power) for use in applications that can tolerate a high cost.

It is therefore an aim of the present invention to obviate or reduce the above mentioned problems.

SUMMARY OF THE INVENTION

According to a non-limiting embodiment of the present invention, there is provided an optical fibre arrangement comprising at least two optical fibre sections, the optical fibre sections each having an outside longitudinally extending surface, and the outside longitudinally extending surfaces being in optical contact with each other.

The invention further includes an optical amplifier constructed from such an optical fibre arrangement, and especially a parallel optical amplifier with multiple amplifying fibres. This embodiment of the invention realizes particular commercial application in optical telecommunication networks.

The apparatus and methods of the invention can enable pump power to be conveniently coupled into optical amplifiers and lasers.

The apparatus and methods of the invention can enable optical amplifiers and lasers to be constructed that are more immune to pump failure than are prior art devices.

The apparatus and methods of the invention can enable optical amplifiers and lasers to be conveniently constructed having additional functionality.

The apparatus and methods of the invention can enable a route for lower cost optical amplification particularly useful in optical networks.

The apparatus and methods of the invention can reduce the effects of granularity in optical networks.

The apparatus and methods of the invention can enable individual wavelength channels in WDM networks to be amplified and balanced.

The apparatus and methods of the invention can enable high-power optical amplifiers and high-power fibre lasers to be constructed.

The invention also provides an optical fibre arrangement comprising a plurality of optical fibres each having an outside surface and defining a length, and wherein the outside surface of at least two adjacent optical fibres are in optical contact along at least a respective portion of their lengths.

The optical fibre arrangement can comprise a plurality of optical fibres that are surrounded by a coating material along the length of the optical fibre arrangement.

The invention also provides a method for manufacturing an optical fibre arrangement comprising the following steps: providing a plurality of optical fibre preforms, each optical fibre preform comprising a plurality of optical fibres, each optical fibre defining an outside surface and a length, mounting the plurality of optical fibre preforms in a fibre drawing tower, drawing a plurality of optical fibre from the plurality of optical fibre preforms under a drawing tension and at a drawing speed, the drawing tension and the drawing speed being selected such that the outside surface of at least two adjacent optical fibres are in optical contact along at least a respective portion of their lengths. The plurality of optical fibres can be twisted or intertwined during the drawing process.

The plurality of optical fibres can be coated by passing the fibres through a coating cup filled with a coating material.

The invention also provides a method for manufacturing an optical fibre arrangement comprising the following steps: providing a plurality of optical fibres, each optical fibre defining an outside surface and a length, pulling the plurality of optical fibre under a drawing tension and at a drawing speed, the drawing tension and the drawing speed being selected such that the outside surface of at least two adjacent optical fibres are in optical contact along at least a respective portion of their lengths. The plurality of optical fibres can be twisted during the drawing process.

The invention also provides an amplifying optical device having an optical pump and an optical fibre arrangement comprising a plurality of lengths of at least one optical fibre, each length of the optical fibre defining a longitudinally extending outside surface, the arrangement being such that the outside surfaces of at least two adjacent lengths of the optical fibre are in optical contact with each other.

The amplifying optical device can be an amplifier comprising a plurality of amplifying fibres, each having an input and an output, at least one pump optical fibre having two ends, and a pump that supplies pump energy connected to the pump optical fibre, the amplifier being configured such that the pump energy is shared by the plurality of amplifying fibres.

The amplifying optical device can be an amplifier comprising at least one input fibre, a first multiplexer connected to the input fibre, a coupler, and at least one output port connected to the coupler, the amplifier being configured such that at least one of the amplifying optical fibres is connected to the first multiplexer and at least one of the amplifying optical fibres is connected to the coupler.

The fiber arrangement can serve to couple light from one or more pump fibers into one or more signal fibers. The signal fibers can incorporate a core for guiding signal (or generated in case of a laser) light through the arrangement. The cores can be single-moded. The region surrounding the cores of these fibers is capable of guiding pump light. These signal fibers each have two ends, at least one of which is accessible, for example in the sense that other fibers can be spliced to said signal fibres. The pump fibers are capable of guiding highly multi-moded pump beams from a pump source into the arrangement. The pump fibers each have two ends. Light can be launched into the pump fibers through their ends.

The invention also provides an amplifying arrangement comprising a plurality of optical amplifiers each having a plurality of amplifying optical fibres and further comprising a second multiplexer connected to each first multiplexer.

The amplifying optical arrangement can comprise a plurality of optical amplifiers and an optical device, the amplifying optical arrangement being configured such that the optical device is connected to at least one optical amplifier.

The optical device can comprise at least one of an optical router, an optical switch, a gain flattening filter, a polarizer, an isolator, a circulator, a grating, an optical fibre Bragg grating, a long-period grating, an acousto-optic modulator, an acousto-optic tunable filter, an optical filter, a Kerr cell, a Pockels cell, a dispersive element, a non-linear dispersive element, an optical switch, a phase modulator, a Lithium Niobate modulator, or an optical crystal.

The invention also provides an amplifying optical device comprising a fibre arrangement formed as a coil of a plurality of turns of amplifying optical fibre, the fibre comprising an inner core and an outer cladding, the arrangement being such that the claddings of adjacent fibres of at least a pair of the turns touch one another. The coil can be coated, and the coil can comprise at least one amplifying optical fibre and at least one pump optical fibre.

An amplifying optical device such as a laser or an optical amplifier constructed from a coil of uncoated optical fibre has the following advantages compared to the prior art:

1. It is based on an all-glass amplifying fibre: This overcomes the power limitations associated with polymer outer claddings.
2. It has a single pump-guiding cladding with an embedded core, but no coating or outer cladding. This overcomes the problems with accessing the pump waveguide for side-splicing that arises in other all-glass structures.
3. It uses a glass-air waveguide for guiding the pump. This results in a high NA>1.
4. It has a substantially reduced glass-air surface area compared to previous fibre laser designs. This reduces the losses that arise at such an interface.
5. It can be formed by coiling a fibre and fixing it (e.g., by fusing) into a rigid body.
6. It eliminates the requirement (in a prior-art cladding-pumped fibre amplifier or fibre laser) that the fibre from which this new structure is made must be able to guide the pump i.e., is large enough and with sufficient NA (and assuming that the amplifier or laser structure is made by coiling a fibre). Thus, a fibre with a much smaller outer diameter and hence a much lower passive-cladding to active-core volume ratio (=area ratio) can be used. This improves pump absorption and thereby efficiency. Instead, it is enough that the structure as a whole can guide the pump. For instance, a pump coupler can be side-spliced to the structure rather than to a single point on a single fibre or the pump energy can be introduced with a plurality of pump optical fibres that can be of such a size that they can be located in the interstitial spaces within the coil.
7. It eliminates the need for special geometries for improved pump absorption. In a prior-art cladding-pumped fibre, special measures like off-center cores, non-circular claddings, or bending of the fibre to special geometries is normally needed to improve the pump absorption because some pump modes are otherwise absorbed too slowly. The disclosed structure can help to eliminate the geometrical similarities and symmetries between the pump waveguide and signal waveguide (core). This improves the pump absorption even in the absence of any further measures as described above.
8. It can be securely supported at a few points in space. This reduces any excess pump propagation loss that can arise at such supporting points, because these perturb the waveguiding air-glass interface. The structure can be supported by the fiber pig-tails. These are typically coated, and so can be fixed without any pump loss.
9. It provides means for preventing pump light from leaking out through pump delivery fibres.

The invention also provides an optical fibre laser comprising an amplifying optical device comprising a pump source and an optical fibre arrangement, and an optical feedback arrangement for promoting light generation within the laser.

The invention also provides a method for reducing the granularity in optical telecommunications network, which method comprises providing at least one amplifying optical arrangements as described herein having a plurality of amplifying optical fibres in at least one location within the network.

The invention also provides an optical telecommunications network comprising at least one of the amplifying optical arrangements described herein, and having a plurality of amplifying optical fibres.

BRIEF DESCRIPTION OF THE DRAWINGS

Embodiments of the invention will now be described solely by way of example and with reference to the accompanying drawings in which.

DETAILED DESCRIPTION OF PREFERRED EMBODIMENTS OF THE INVENTION

Figure 1:
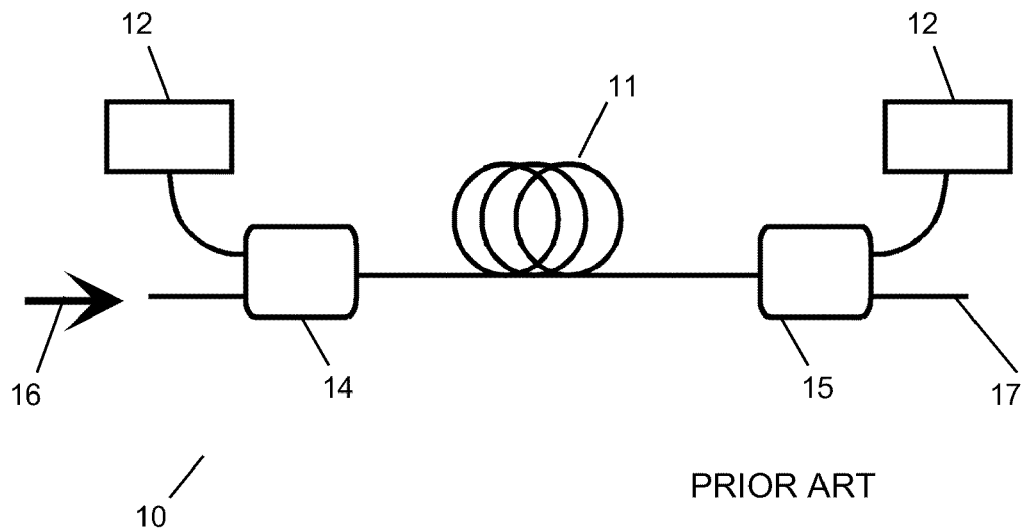
FIG. 1 is a diagram of a prior art fibre amplifier.

FIG. 1 shows a schematic diagram of a conventional optical amplifier 10 according to prior art. The optical amplifier 10 is based on an erbium (Er)—doped optical fibre 11 that is optically pumped by two pump lasers 12 whose pump energy is coupled into the Er-doped optical fibre 11 via first and second wavelength division multiplexers 14 and 15. An input signal 16 is coupled into the Er-doped optical fibre 11 via the first wavelength division multiplexer 14, is amplified by the Er-doped optical fibre 11, and is coupled to an output port 17 via the second wavelength division multiplexer 15. The Er-doped optical fibre 11 is a single mode optical fibre containing the erbium doping within its core. Thus the single mode core guides both the signal 16 and the pump energy from the pump lasers 12.

As can be seen from FIG. 1 a conventional amplifier does not offer any pump redundancy: if one of the pump lasers 12 fails, the gain of the amplifier 10 drops significantly. Moreover today's semiconductor-diode pump lasers can deliver no more than about 200 mW of power into a single-mode fibre. This limited pump power imposes limits on achievable signal power that can be output from the amplifier 10.

Recently Spectra Diode Labs Inc of San Jose, Calif., USA has developed a wavelength-multiplexed pump module. This source combines the output of up to four pump modules to obtain up to 500 mW of pump power [see for example Spectra Diode Labs product catalogue, part # SDLO WM4]. In this module four individual pumps are spectrally separated by 5 nm so that all pumps are within the erbium absorption band. This method offers some protection against failure of pump diodes, but the module itself is quite expensive and cannot be easily upgraded to a greater number of pumps due to the relatively narrow absorption peak of erbium ions in silica glass in the wavelength region around 980 nm [see for example E. Snitzer, H. Po, R. Tumminelli, P. Hakimi, U.S. Pat. No. 4,815,079].

Figure 2:
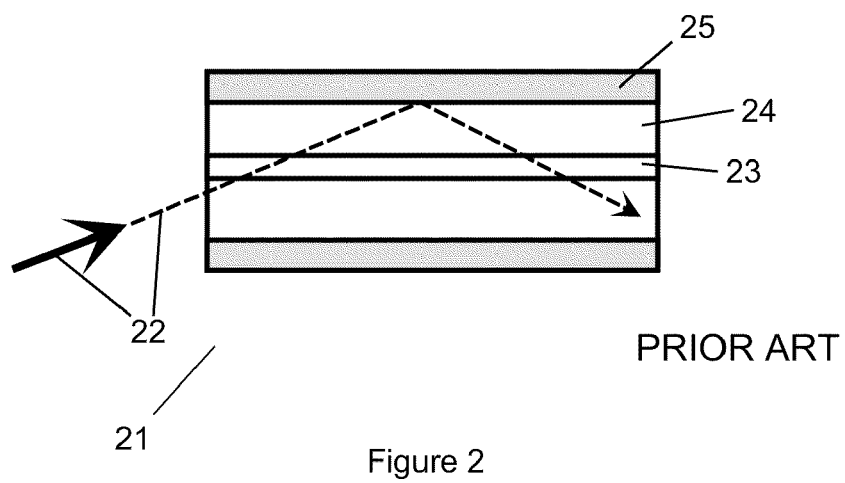
FIG. 2 is a diagram of a prior art double clad fibre structure.

An approach to increase the signal power available from an optical amplifier is suggested in V. P. Gapontsev and I. Samartsev, WO95/10868: the use of a so-called double-clad fibre for cladding-pumping. The prior-art principle is shown in FIG. 2. A double-clad fibre 21 comprises a core 23, a primary (inner) cladding 24, and a secondary (outer) cladding 25. Pump light 22 is launched directly into the primary cladding 24, which is capable of guiding light due to the presence of the secondary cladding 25 which has a lower refractive index than the refractive index of the primary cladding 24. The secondary cladding 25 is typically a polymer coating that is applied during the manufacture of the double-clad fibre 21.

In this type of optical amplifier, the core 23 is usually doped with rare-earth ions, while the pump light 22 is launched into the primary cladding 24. Typically, the diameter of the core 23 is in the region of 5-25 µm and the refractive index difference between the core 23 and the primary cladding 24 is between $3 \times 10^{-3}$ and $1 \times 10^{-2}$. A relatively large diameter of the primary cladding 23 allows the use of broad stripe, semiconductor-laser pump diodes with 1 to 5 W of pump power obtained from a 100 µm×1 µm stripe. The result is that cladding pumped fibre amplifiers based on the double-clad fibre 21 can deliver much higher output power in comparison with the conventional, core-pumped amplifier 10.

Figure 3:
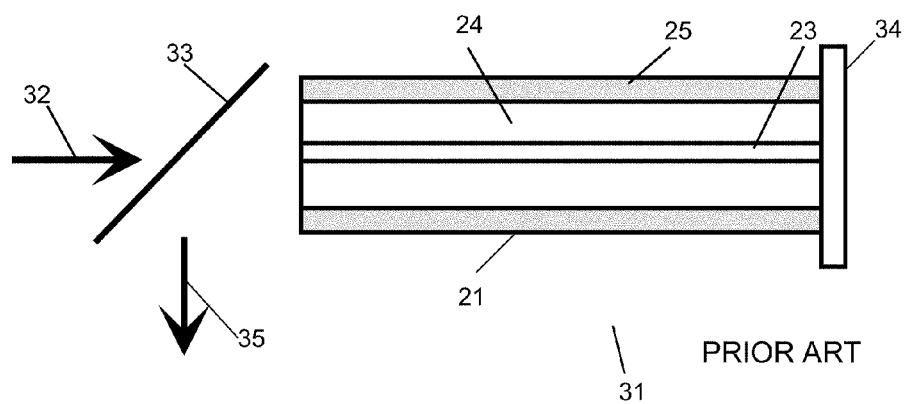
FIG. 3 is a diagram of a prior art fibre laser.

FIG. 3 shows the prior art double-clad fibre 21 configured as a fibre laser 31. In this configuration, a pump beam 32 is launched through a dichroic mirror 33 into the double-clad fibre 21. A high-reflectivity mirror 34 is used to reflect back both pump and signal. The resulting signal 35 from the fibre laser 31 is separated from the pump beam 32 by the dichroic mirror 33.

Cladding-pumped optical amplifiers can be constructed using dichroic mirrors in similar configurations to the fibre laser 31 shown in FIG. 3. However, a problem associated with this and many other experimental devices based on double-clad fibres 21 is that it is difficult to access the signal of the fibre laser or amplifier because it is necessary to use one or both ends of the double-clad fibre 21 for launching pump power. A further limitation is that at most two pump diodes can be launched into the double-clad fibre 21 unless complex polarization or wavelength division multiplexed schemes are used. Accordingly, simple end-pump prior art configurations of fibre lasers and amplifiers such as shown in FIG. 3 offer limited pump redundancy.

Figure 4:
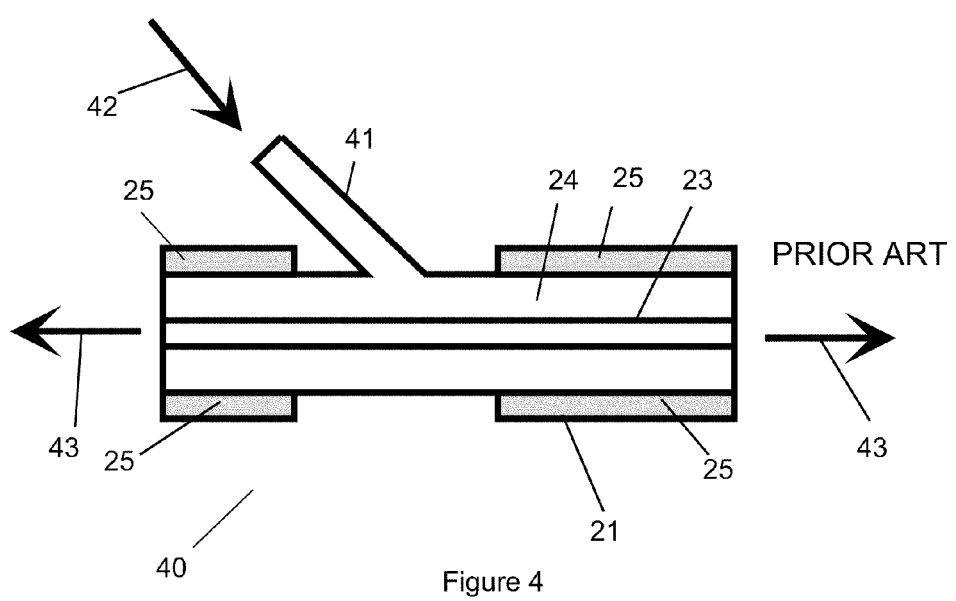
FIG. 4 is a diagram of a prior art pump scheme.
Figure 5:
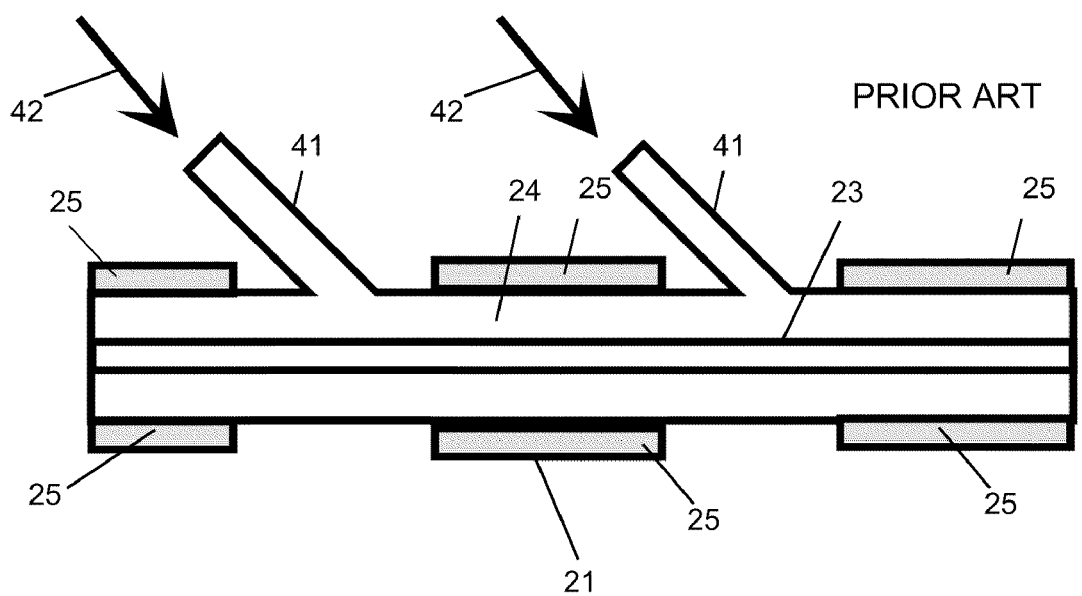
FIG. 5 is a diagram of a prior art multiple pump scheme.

FIG. 4 shows a prior art multimode fibre coupler 40. An auxiliary pump optical fibre 41 is used to launch pump light 42 into a double-clad fibre 21 that is doped with rare-earth ions in its core 23. Upon pumping, the rare earth ions become excited and the core becomes amplifying. The resulting amplified spontaneous emission provides an output signal 43 from both ends of the double-clad fibre 21. A main advantage of this scheme is that both ends of the double-clad fibre 21 are now accessible for launching and out-coupling signal power for signal manipulation [see for example D. J. DiGiovanni, R. S. Windeler, A. M. Vengsarkar, J. L. Wagener, U.S. Pat. No. 5,802,236]. Furthermore, this scheme can offer protection against pump diode failure using multiple auxiliary pump optical fibres 41 as shown in the prior art diagram of FIG. 5. The solution shown in FIGS. 4 and 5 is therefore highly flexible allowing many configurations of fibre lasers and amplifiers to be constructed.

However, a major problem associated with the use of the multimode fibre coupler 40 is it is necessary to remove the secondary cladding 25 in order to attach the auxiliary pump optical fibre 41 to the double-clad fibre 21. This is a difficult process, resulting in a numerical aperture (NA) mismatch and potential reliability issues.

An important parameter for double-clad fibres is the numerical aperture for the inner cladding. The numerical aperture depends on the refractive indices of the inner and outer cladding. The refractive index of the inner cladding is determined by choice of material, a choice that depends on several other parameters besides the refractive index. Fused silica is one preferred material for the inner cladding, with a refractive index of 1.45. This is relatively low refractive index, which makes it difficult to find a material for the outer cladding with a desired, much lower, refractive index. A polymer cladding is one possibility. For instance, silicone rubber would lead to an NA for the inner cladding of 0.4.

While 0.4 is a relatively large numerical aperture, polymer coatings can suffer from rather low power handling capability and a relatively high loss. Reliability is also a concern. These issues become more critical the higher output power is required. An all-glass structure with a glass outer cladding is preferred from these points of view. However, even a low-index glass like fluorosilicate leads to an NA of only 0.25 with a pure fused silica inner cladding. This low NA imposes certain limitations on the performance of cladding pumped fibre lasers and amplifiers. The main constraint arises from the brightness theorem. This is a fundamental governing law that dictates system design. It states that the brightness J of an optical system can not be increased by passive means, and this can be written as $$J_{pump} = \frac{P_{pump}}{A_{eff}^p \cdot \Omega_x \Omega_y} \geq J_{fibre} = \frac{P_{fibre}}{A_{eff}^f \cdot NA^2}$$

where $A_{eff}^j$ is an effective cross section of the pump diode or fibre, $\Omega_i$ is the pump diode divergence in fast and slow directions and NA is the numerical aperture of the fibre for the pump beam.

Currently, laser diodes offer brightness in the region of 0.3 W/μm² (assuming 2 W, 100×1 μm stripe and 0.7×0.1 NA). For reliability reasons the pump diodes are often down-rated by a factor of 4, so that the real brightness is in the region of 0.1 W/μm². Thus for example, a 10 W fibre laser system requires about 50 W of pump power delivered by 25 to 50 pump diodes (assuming 20% overall optical efficiency). If the system is based on a fibre with inner and outer claddings of different glass materials with an NA of 0.25 for typical choices of glasses, the fibre outer diameter (OD) should be greater than 100 μm. Thus even a modest 10 W of output power would require a fibre OD greater than 100 μm. For 200 W lasers the fibre OD should be in the region of 1 mm. This creates problems in that the large inner cladding reduces the interaction between the pump beam and the core. Therefore, even longer fibres are required.

A typical double-clad fibre with a silica inner cladding according to the prior art can either have a low-index polymer coating with a high NA and low power handling, or a relatively higher index glass outer cladding with a low NA but that can handle high powers well. Both of these options impose limits on the design and performance of high-power fibre lasers.

Recently, a new approach to an all-glass structure with a high NA has been demonstrated [D. J. DiGiovanni, R. S. Windeler, A. M. Vengsarkar, J. L. Wagener, U.S. Pat. No. 5,802,236]. The basic idea is to let the pump waveguide be formed by glass surrounded by air, with NA>1. The structure is then supported by a thin outer glass shell that surrounds the fibre and runs along its length. However, this type of fibre is not readily used together with the pump-couplers of FIGS. 4 and 5. Moreover, because of the large difference in refractive indices between air and glass, it is quite difficult to make a pump waveguide with sufficiently low loss.

It is also difficult to use the pump couplers in FIGS. 4 and 5 with all-glass double-clad fibres: it is difficult to remove the glass outer cladding, as is required for efficient coupling. Even the polymer-clad fibre presents problems for the pump coupler: while it is easy to remove the outer cladding to expose the inner cladding for pump coupling, the coating at the point on the fibre where the coating reappears will absorb a large fraction of the power lost in the device, since at this point, any mode that is guided by the glass-air interface, but not by the glass-polymer interface, will be absorbed. This can cause the coating to burn, and therefore limits the power that the coupler can handle.

Figure 7:
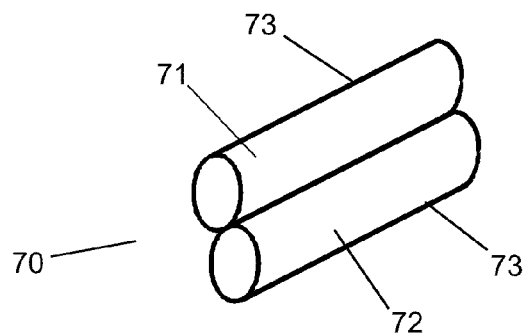
FIG. 7 is a diagram of an embodiment of the present invention.

With reference to FIG. 7, there is provided an optical fibre arrangement 70, which optical fibre arrangement 70 comprises at least two optical fibre sections 71, 72, the optical fibre sections 71, 72 each having an outside longitudinally extending surface 73, and the outside longitudinally extending surfaces 73 being in optical contact with each other.

By "optical contact" we mean that light propagating in the near surface region in one of the adjacent optical fibre sections 71 can penetrate into the near-surface region of the other adjacent optical fibre section 72. This will clearly not be the case if one of the optical fibre sections is coated with a typical coating such as an acrylate or silicone compound. The optical fibre sections 71, 72 can be of constant cross-section along their length.

The optical fibre sections 71, 72 can comprise a core and at least one cladding. The core can be circular or non-circular. The core can be in the located in the center of the cladding or offset from the center. The cladding can be circular or non-circular. One or more of the optical fibre sections 71, 72 can comprise a glass rod that can be silica or soft glass.

Figure 8:
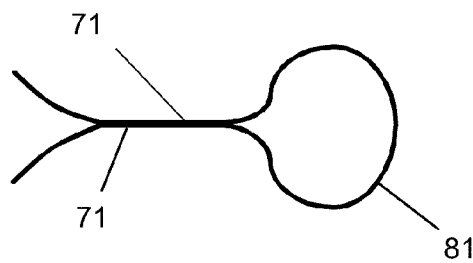
FIG. 8 is a diagram of an embodiment of the present invention in which the optical fibre sections are from the same optical fibre.
Figure 9:
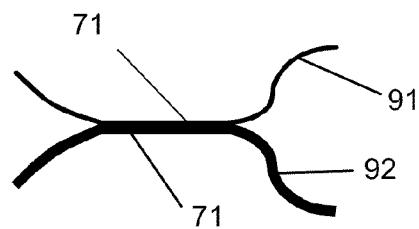
FIG. 9 is a diagram of an embodiment of the present invention in which the optical fibre sections are from different optical fibres.

The optical fibre sections 71, 72 can be constructed from the same optical fibre 81 as shown in FIG. 8, or from different optical fibres 91, 92 as shown in FIG. 9.

Figure 10:
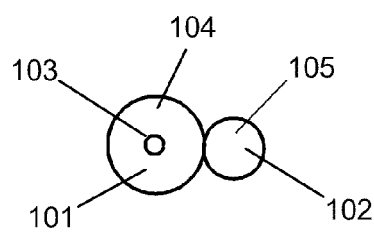
FIG. 10 is a diagram of an embodiment of the present invention where the fibres have different diameters.
Figure 11:
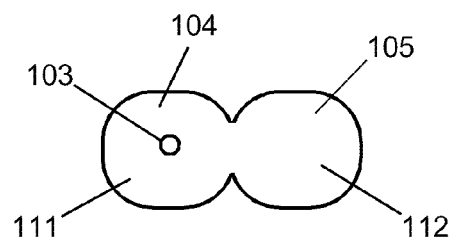
FIG. 11 is a diagram of an embodiment of the present invention in which the optical fibre sections are fused together.
Figure 12:
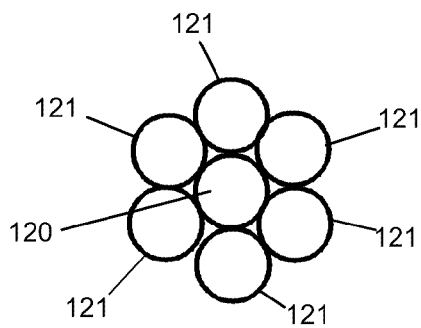
FIGS. 12 to 19 depict various optical fibre arrangements with a plurality of first and second optical fibres according to the present invention.
Figure 13:
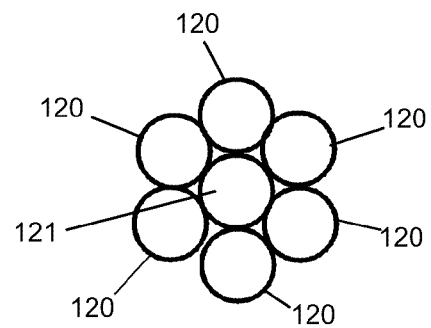
Figure 14:
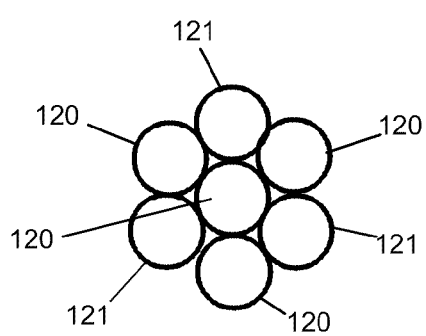
Figure 15:
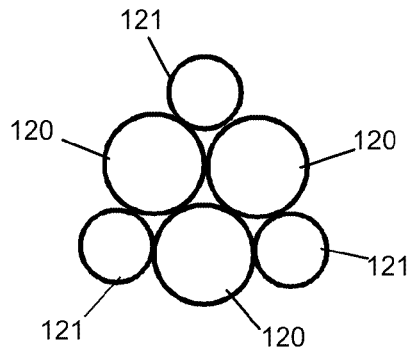
Figure 16:
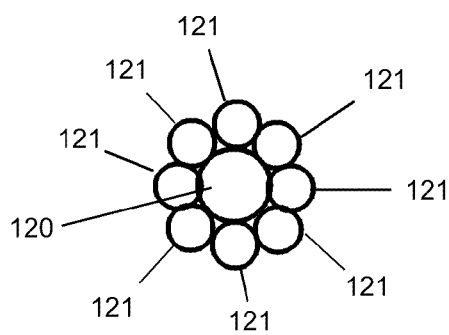
Figure 17:
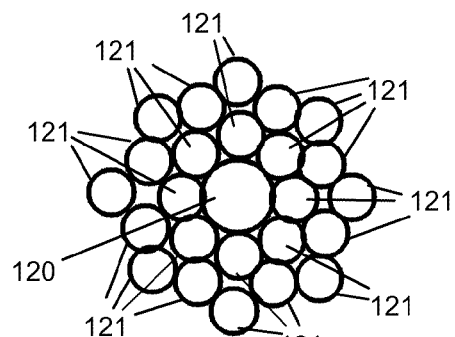
Figure 18:
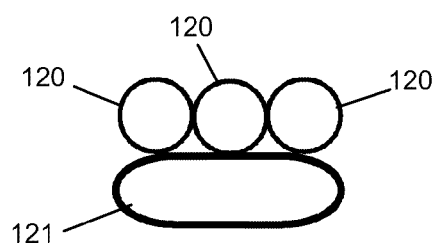
Figure 19:
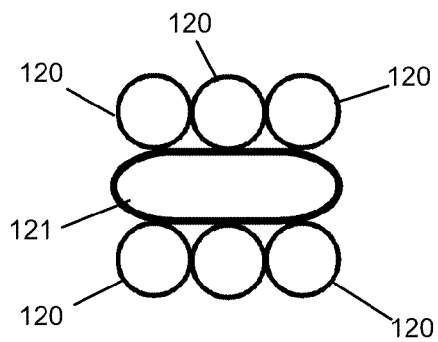

FIG. 10 depicts a cross-section through an optical fibre arrangement in which a first optical fibre 101 having a core 103 and a cladding 104 is in optical contact with a second optical fibre 102 having only a cladding 105. The first optical fibre can be a single-mode or multi-mode optical fibre and the second optical fibre 102 can be silica rod. The optical fibre arrangement is preferably constructed from freshly drawn optical fibre. FIG. 11 depicts a similar optical fibre arrangement in which a first optical fibre 111 is fused to a second optical fibre 112. The optical fibres are preferably fused during the fibre drawing process (in which the optical fibre is manufactured) or subsequently. The first and second topical fibres 111, 112 can be single-mode or multi-mode optical fibres.

FIGS. 12 to 20 show alternative optical fibre arrangements in which at least one first optical fibre 120 is optically connected to at least one second optical fibre 121. Each of the first and second optical fibres 120, 121 can have a circular cross section or a non circular cross section, and either or both the first and second optical fibres 120, 121 can each contain waveguiding cores that can be situated in the center of the optical fibre 120, 121 or offset from the center.

The first and second optical fibres 120, 121 can be formed from a glass selected from the group consisting of silica, doped silica, silicate, phosphate, and soft glass. The first optical fibre 120 can also be an amplifying optical fibre doped with rare-earth ions.

The amplifying optical fibre preferably has a single multi-mode cladding and a waveguiding core. The core and/or cladding can comprise at least one rare earth dopant comprising Ytterbium, Erbium, Neodymium, Praseodymium, Thulium, Samarium, Holmium, Dysprosium or it can be doped with a transition metal or a semiconductor. The core and/or cladding can be co-doped with Erbium/Ytterbium. The core and/or cladding can be doped with germanium, phosphorous, boron, aluminium and/or fluoride. The core diameter can be substantially in the range of 2 µm to 100 µm. The cladding area can be at least 10 to 1000 times larger then the cross sectional area of the core.

More than one amplifying optical fibre can be included in the optical fibre arrangement 70, each one of the amplifying optical fibres containing the same dopants or different dopants. The second optical fibre 121 can be a pump optical fibre, the pump optical fibre being in optical contact with the amplifying optical fibre along at least a portion of its length.

Figure 20:
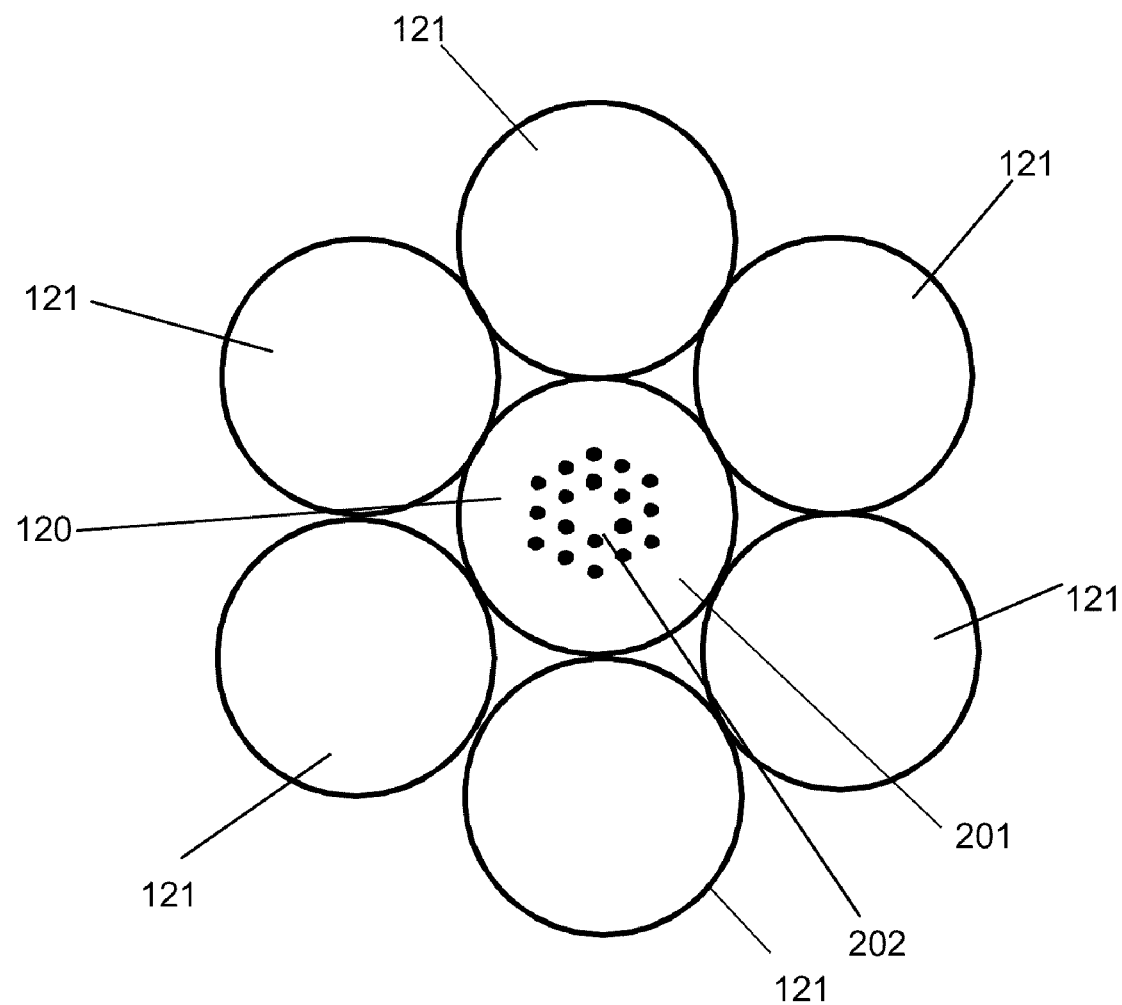
FIG. 20 depicts an optical fibre arrangement according to the present invention including a holey fibre.

FIG. 20 depicts a cross-section through an amplifying optical arrangement 70 in which the first optical fibre 120 is a so-called "holey fibre" 201 (or "photonic bandgap fibre") that comprises a waveguide constructed from a lattice of azimuthal holes 202 extending along the axis of the fibre 201. The holey fibre 201 can be doped with one or more of the rare earth dopants comprising Ytterbium, Erbium, Neodymium, Praseodymium, Thulium, Samarium, Holmium, Dysprosium, or it can be doped with a transition metal or a semiconductor. The core and/or cladding can be co-doped with Erbium/Ytterbium. The lattice can be a regular lattice or an irregular lattice.

The second optical fibre 121 can be a pump optical fibre, the pump optical fibre being in optical contact with the holey fibre 201 along at least a portion of its length. The amplifying optical arrangement can contain a single second optical fibre 121 or a plurality of second optical fibres 121. The second optical fibre 121 can also be a pump optical fibre, the pump optical fibre being in optical contact with the amplifying optical fibre along at least a portion of its length.

Figure 21:
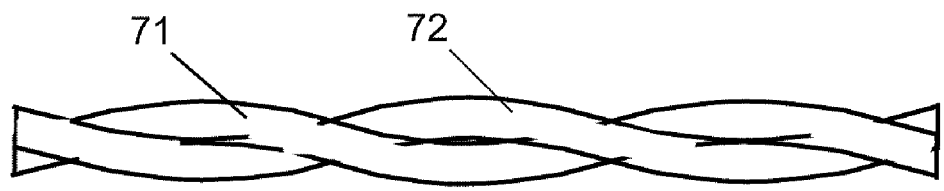
FIG. 21 depicts an optical fibre arrangement according to the present invention in which the optical fibre sections are twisted with respect to each other.
Figure 22:
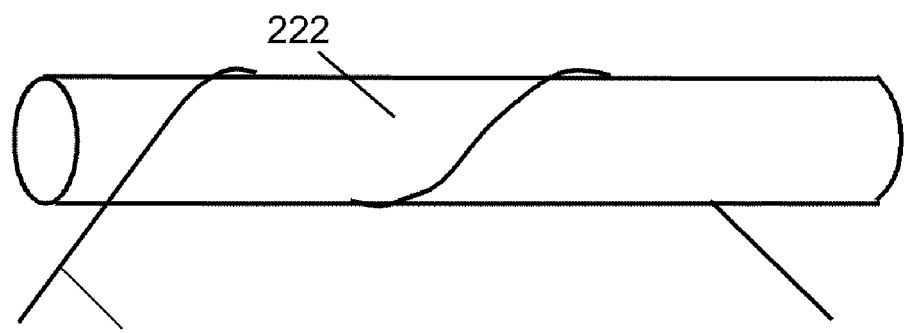
FIG. 22 depicts an optical fibre arrangement according to the present invention in which a pump optical fibre is twisted around an amplifying optical fibre.
Figure 23:
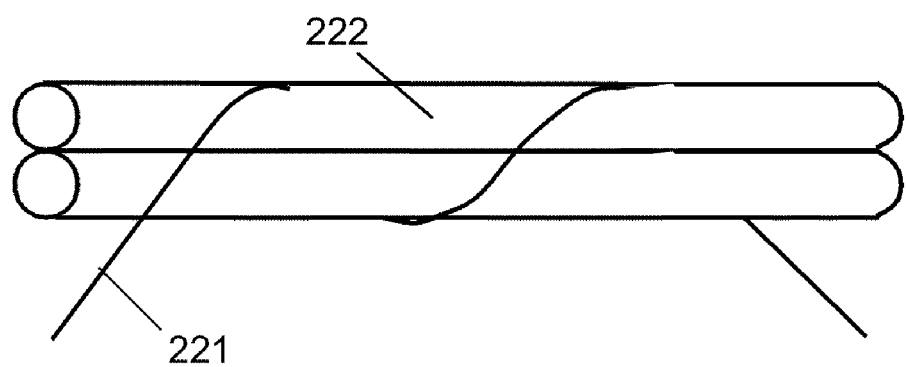
FIG. 23 depicts an optical fibre arrangement according to the present invention in which a pump optical fibre is twisted around two amplifying optical fibres.

FIG. 21 depicts an optical fibre arrangement in which the optical fibre sections 71, 72 are twisted about each other. The term "twisted" is being used here in a very general sense as is illustrated in FIGS. 22 and 23 where a pump optical fibre 221 is shown twisted around at least one amplifying optical fibre 222. The pump optical fibre 221 is shown as having a diameter very much less than that of the amplifying optical fibre 222. The amplifying optical fibres 222 in FIG. 23 are shown in optical contact with each other and with the pump optical fibre 221.

The amplifying optical fibre 222 preferably has a single multimode cladding and a waveguiding core. The core and/or cladding can comprise at least one rare earth dopant comprising Ytterbium, Erbium, Neodymium, Praseodymium, Thulium, Samarium, Holmium, or Dysprosium, or it can be doped with a transition metal or a semiconductor. The core and/or cladding can be co-doped with Erbium/Ytterbium. The core and/or cladding can be doped with germanium, phosphorous, boron, aluminium and/or fluoride. The core diameter can be substantially in the range of 2 µm to 100 µm. The cladding area can be at least 10 to 1000 times larger then the cross sectional area of the core. The rare earth dopant can be disposed in the core, in the cladding, in regions in the core and the cladding, or in a ring around the core.

More than one amplifying optical fibre 222 can be included in the optical fibre arrangement 70, each one of the amplifying optical fibres 222 containing the same dopants or different dopants.

The amplifying optical fibre 222 can comprise a waveguide constructed from so-called "holey fibre" or "photonic bandgap fibre" and can be doped with one or more of the rare earth dopants listed above.

The pump optical fibre 221 can have a substantially uniform refractive index across its cross-section and can be drawn from a silica rod.

Figure 24:
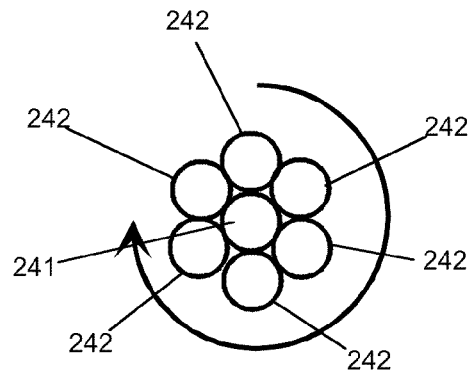
FIG. 24 depicts an optical fibre arrangement according to the present invention in which six second optical fibres are twisted about a first optical fibre.

FIG. 24 depicts a first optical fibre 241 and six second optical fibres 242 twisted together in such a way that the outside surface of at least two adjacent fibres are in optical contact along at least a respective portion of the length of the optical fibre arrangement. The first optical fibre 241 can be the amplifying optical fibre 222, and the second optical fibre 242 can be the pump optical fibre 221. Alternatively the first optical fibre 241 can be the pump optical fibre 221 and the second optical fibre 242 can be the amplifying optical fibre 222.

Figure 25:
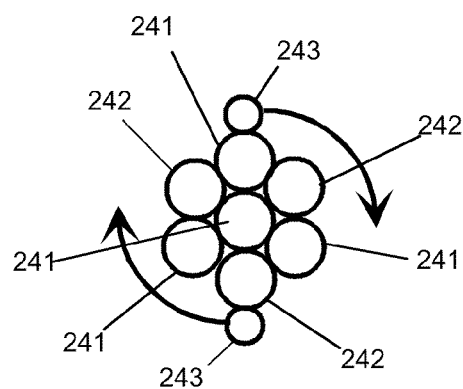
FIG. 25 depicts an optical fibre arrangement according to the present invention in which third optical fibres are twisted around first and second optical fibres.

FIG. 25 depicts yet another arrangement in which four first optical fibres 241 and three second optical fibres 242 are straight, and two third optical fibres 243 are twisted around the first and second optical fibres 241 and 242.

Figure 26:
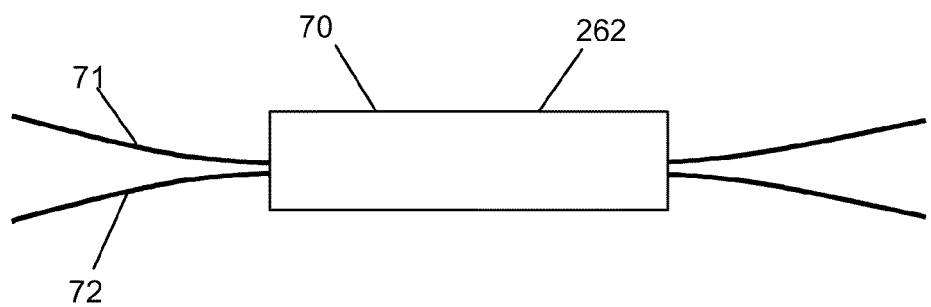
FIG. 26 depicts an optical fibre arrangement according to the present invention in which the optical fibre sections are coated.

FIG. 26 depicts an optical fibre arrangement in which the optical fibre sections 71, 72 are surrounded by a coating material 262 along a length of the optical fibre arrangement. For clarity, the optical fibre sections 71, 72 are shown extending and separating on either side of the coating material 262. The coating material can be a polymer with a refractive index less than the refractive index of a cladding material of at least one of the optical fibre sections 71, 72. The coating material can be silicone rubber. The optical fibre sections 71, 72 can be a section of the amplifying optical fibre 222 and/or a section of the pump optical fibre 221.

Advantageously, one of the optical fibre sections 71, 72 can be individually separated by pulling it from the remaining optical fibre section or sections 71, 72. This is a feature which can be particularly useful in the design and manufacture of a range of optical fibre amplifiers and lasers, since it simplifies the problem of coupling of multiple pump sources to an optical fibre amplifier or fibre laser. It also enables parallel (i.e., multi-channel) optical amplifiers to be constructed, can have major cost and reliability advantages over the prior art.

Figures 27, 28:
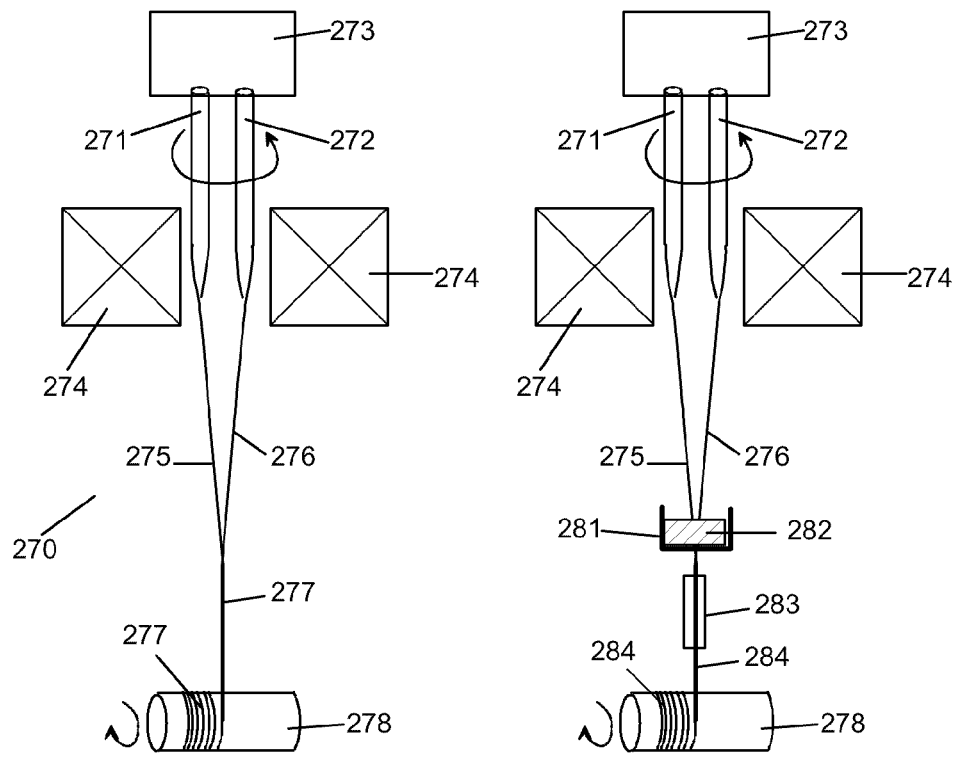
FIG. 27 depicts an apparatus for manufacturing an optical fibre arrangement according to the present invention.
FIG. 28 depicts an apparatus for manufacturing an optical fibre arrangement having a coating according to the present invention.

FIG. 27 depicts an apparatus for manufacturing long lengths of an optical fibre arrangement in the form of an optical fibre cable 277. A first and second optical fibre preform 271, 272 is placed in a chuck 273 on a fibre drawing tower 270 and lowered into a furnace 274. A first and second optical fibre 275, 276 is drawn from the first and second optical fibre preforms 271, 272, twisted together, and wrapped around a drawing drum 278, which rotates at a given speed. The first and second optical fibres 275, 276 are drawn by rotating the drawing drum 278, and rotating the first and second optical fibre preforms 271, 272 while lowering the first and second optical fibre preforms 271, 272 into the furnace. The first and second optical fibres 275, 276 can be twisted together by rotating the chuck 273.

FIG. 28 depicts a similar apparatus, which includes a coating cup 281 containing a coating material 282 that is cured in a curing apparatus 283 during the fibre drawing process. The curing apparatus can be a furnace or a UV curing chamber depending on the type of coating material being applied.

The invention therefore provides the following method for manufacturing an optical fibre arrangement comprising: providing a first and second optical fibre preform 271, 272 having optical fibres 275, 276; mounting the first and second optical fibre preforms 271, 272 in a chuck 273 on a fibre drawing tower 270; drawing a first and second optical fibre 275, 276 from the first and second optical fibre preforms 271, 272 under a drawing tension and at a drawing speed; and twisting the first and second optical fibre 275, 276 during the drawing process; the drawing tension and the drawing speed being selected such that the outside surface of the first and second optical fibres 275, 276 are in optical contact along at least a respective portion of their lengths. The first and second optical fibres 275, 276 can be passed through a coating cup 281 during the manufacturing process.

It is to be appreciated that it will not always be convenient or practicable to manufacture an optical fibre arrangement directly during the fibre drawing process. The above method can be modified by using uncoated optical fibre, which can be unwound from drums. Such a method comprises the following steps: providing a first and second optical fibre 275, 276; pulling the first and second optical fibres 275, 276 under a drawing tension and at a drawing speed; and twisting the first and second optical fibres 275, 276 during the drawing process; the drawing tension and the drawing speed being selected such that the outside surface of the first and second optical fibres 275, 276 are in optical contact along at least a respective portion of its length. The first and second optical fibres 275, 276 can be passed through a coating cup 281 during the manufacturing process.

It can be convenient to apply a coating to the first and second optical fibres 275, 276 when they are first manufactured that can be removed immediately prior to manufacturing the optical fibre arrangement. Care needs to be taken to ensure that the surface of the optical fibre is not damaged during such removal of the coating.

Referring again to FIG. 26, the coating material 262 can also be a glass having a refractive index less than the refractive index of the pump optical fibre 221. The glass can be applied using a sol-gel process. The glass may be silica glass, a doped silica glass, or a soft glass. Advantageously, the glass can be leached away for example by acid etching to expose the pump optical fibre 221 and the amplifying optical fibre 222 for subsequent connection to optical devices.

Figure 29:
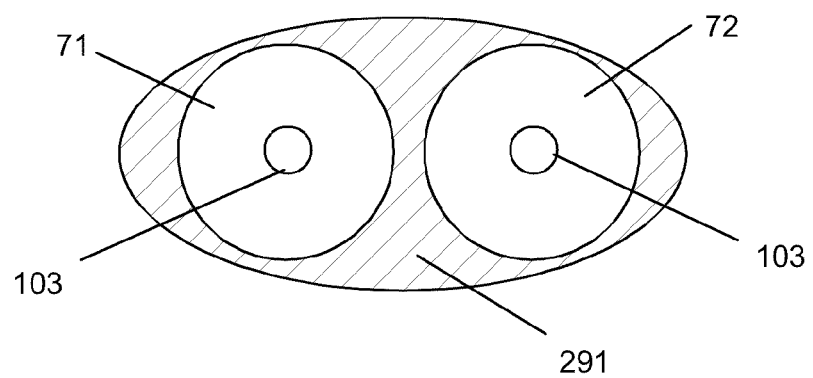
FIG. 29 depicts an optical fibre arrangement according to the present invention in which the optical fibre sections are held together with an optical glue.

FIG. 29 depicts a cross-section of an optical fibre arrangement in which the first and second optical fibre sections 71, 72 are joined together by an optical glue 291. An optical glue in this context means that in an arrangement where two adjacent fibres are in close proximity but separated by a thin layer made of optical glue, then light can propagate from one of the fibres to the other through the optical glue layer.

Figure 30:
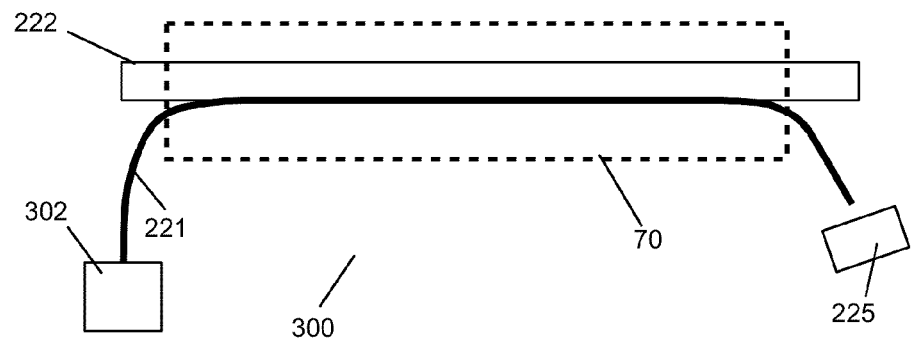
FIG. 30 depicts an amplifying optical device according to the present invention.
Figure 31:
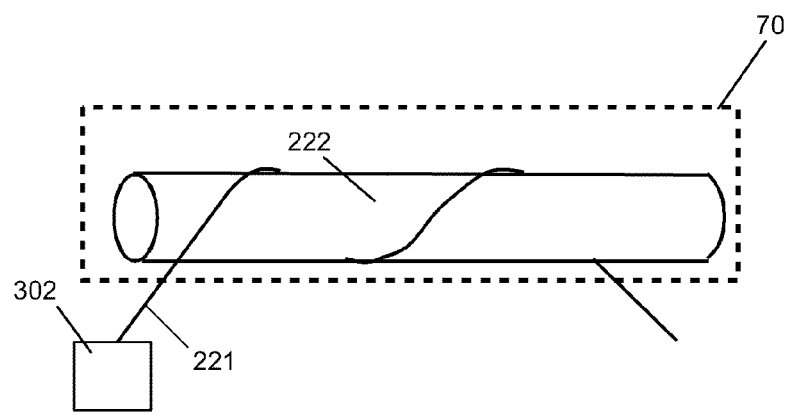
FIG. 31 depicts an amplifying optical device according to the present invention in which a pump optical fibre is twisted around an amplifying optical fibre.

FIG. 30 depicts an amplifying optical device 300 comprising the optical fibre arrangement 70 and a pump source 302. The optical fibre arrangement 70 can be an amplifying optical fibre 222, and a pump optical fibre 221. The pump optical fibre 221 and the amplifying optical fibre 222 are shown in optical contact with each other and thus pump energy propagating along the pump optical fibre 221 couples through to the amplifying optical fibre 222. The pump optical fibre 221 can have a small diameter than the diameter of the amplifying optical fibre 222. The pump optical fibre 221 can have a reflecting device 225 deposited or positioned at or near its end face. The reflecting device 225 can be an optical grating, a mirror, or a loop of optical fibre connected to a fibre coupler. The amplifying optical fibre 222 can be a single-clad uncoated optical fibre. The pump optical fibre 221 can also be twisted around the amplifying optical fibre 222 as shown in FIG. 31.

An optical amplifier based upon the amplifying optical device 300 preferably includes at least one optical isolator orientated to amplify an optical signal at the input of the amplifier and a filter to filter out amplified spontaneous emission at the output of the amplifier. By amplifying optical device we mean an optical amplifier, a power amplifier, a laser, a broadband source of amplified spontaneous emission.

Figure 32:
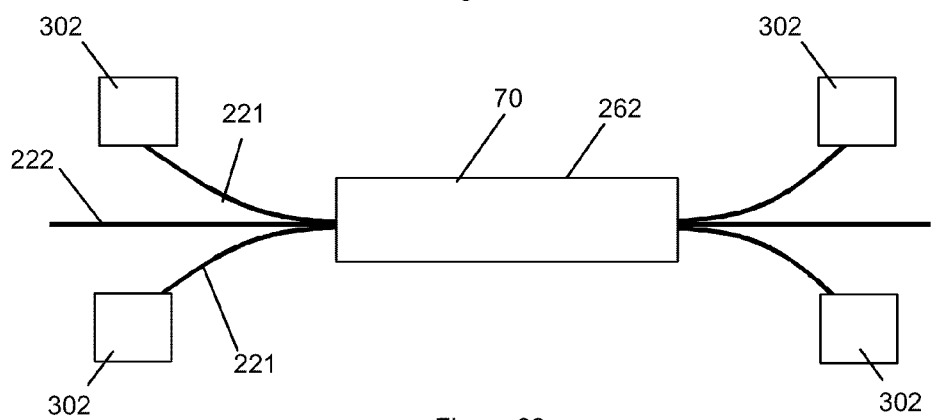
FIG. 32 depicts an amplifying optical device according to the present invention comprising two pump optical fibres.

FIG. 32 depicts an amplifying optical device comprising an optical fibre arrangement 70 in which the optical fibre sections 71, 72 comprise one amplifying optical fibre 222 and two pump optical fibres 221, the amplifying optical fibre 222 and the pump optical fibre 221 being surrounded by the coating material 262. Each end of the pump optical fibres 221 is shown connected to a separate one of the pump sources 302. The figure illustrates the advantage of being able to individually separate the pump optical fibres 221 from the amplifying optical fibre 222. This configuration is especially useful for designing a high-power optical amplifier and moreover offers pump redundancy.

Figure 33:
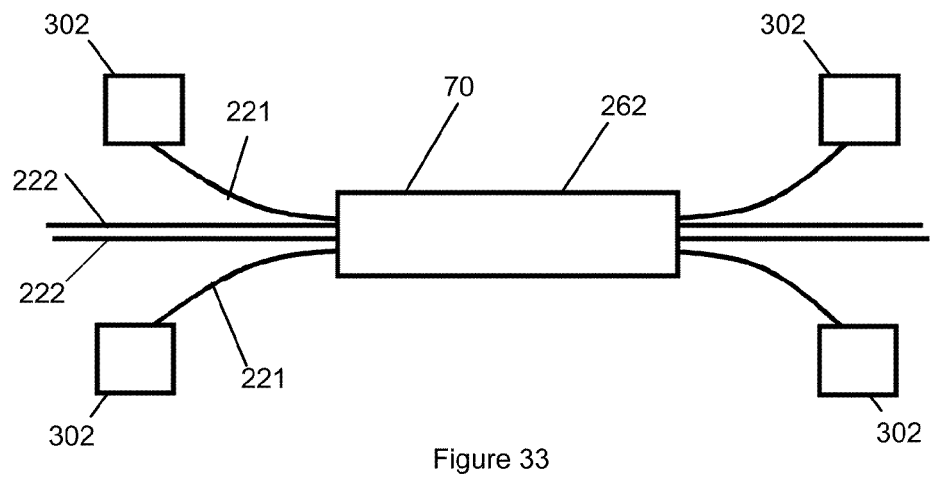
FIG. 33 depicts an amplifying optical device according to the present invention comprising two amplifying optical fibres.

FIG. 33 depicts an amplifying optical device comprising two amplifying optical fibres 222. One of the notable aspects of this embodiment is that the pump energy being supplied by the pump optical sources 302 is shared by more than one of the amplifying optical fibres 222 by virtue of the optical contact between the pump optical fibres 221 and the amplifying optical fibres 222. Further amplifying optical fibres 222 can be added and the amplifying optical device used as a parallel (or multi-channel) optical amplifier. Such an amplifier tends to equalize the output power provided by each of the amplifying optical fibres 222 by virtue of the shared pump energy between the amplifying optical fibres 222. Advantageously, each amplifying optical fibre 222 is capable of amplifying individual signals having the same or different wavelengths with low cross-talk and low interference between signals being amplified by different ones of the amplifying optical fibres 222.

Figure 34:
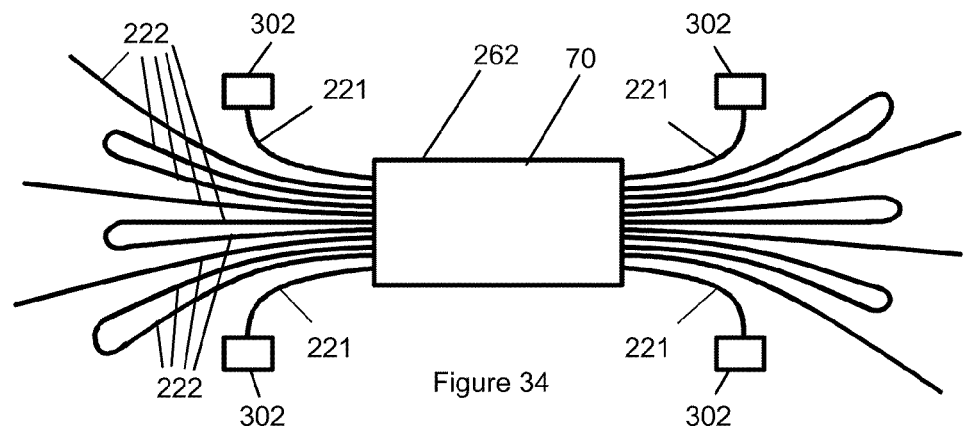
FIGS. 34 to 36 depict an amplifying optical device according to the present invention in which the amplifying optical fibres are joined together in different ways.
Figure 35:
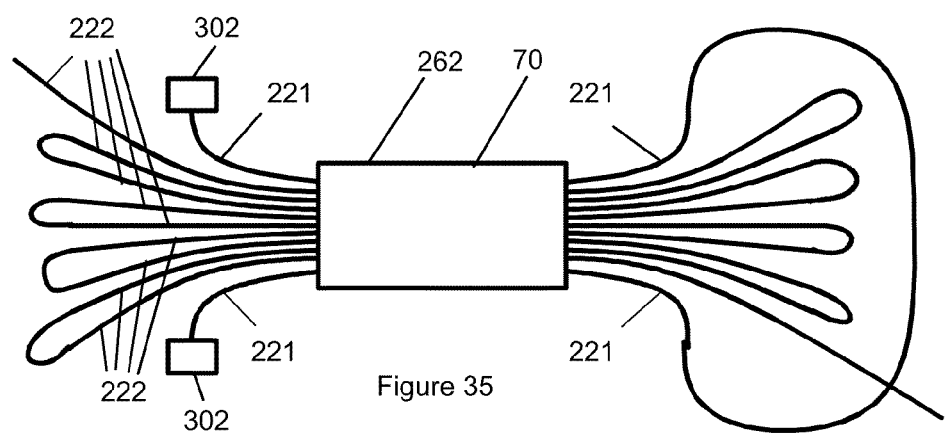
Figure 36:
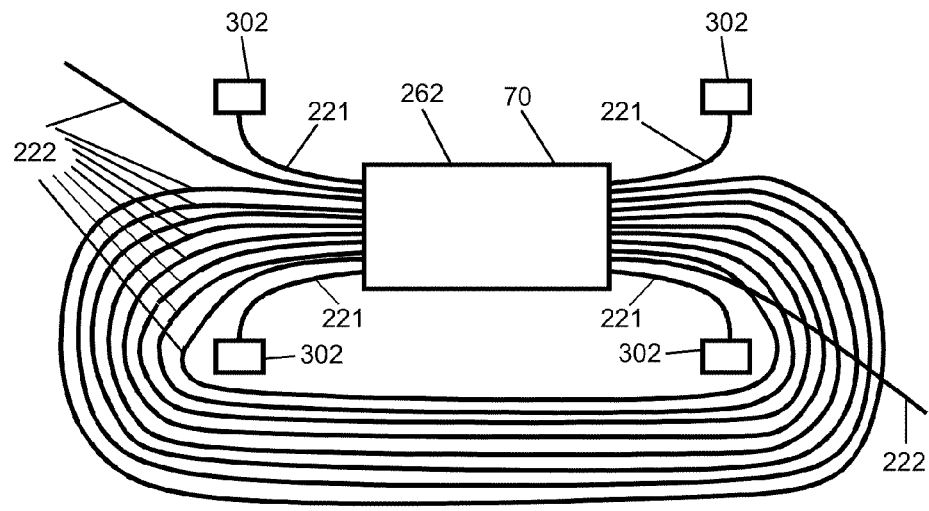

FIGS. 34 to 36 depict an amplifying optical device comprising a plurality of pump optical fibres 221 and a plurality of amplifying optical fibres 222, in which at least one end of the pump optical fibres 221 are connected to a pump source 302 supplying pump energy, and in which the optical fibre arrangement 70 is configured such that a portion of the optical energy guided by each of the pump optical fibres 221 is coupled into at least one of the amplifying optical fibres 222, and in which at least two amplifying optical fibres 222 are connected together. The amplifying optical devices shown in FIGS. 34 to 36 can comprise the coating 262.

The differences between the embodiments shown in FIGS. 34 to 36 is in the number of connections between the amplifying optical fibres 221 and in the connection of the pump optical fibres 221 to the pump sources 302. In FIG. 34, the pump optical fibres 221 are joined together at one end of the amplifying optical device, whereas in FIGS. 34 and 36, each of the ends of the pump optical fibres 221 are connected to different pump sources 302. The advantage of joining the pump optical fibres 221 together is to achieve greater absorption of pump power. This should be compared with the advantages of pumping each of the optical fibres 221 from both ends, which are greater pump redundancy, increased saturation power and increased optical gain. The flexibility in the options for pumping the optical fibre arrangement 70 is an advantage that is achieved with the present invention. The amplifying optical device shown in FIG. 35 can be configured with a single pump source 302, which will reduce the pump redundancy and the saturated power.

The amplifying optical device shown in FIG. 34 is a parallel (or multi-channel) optical amplifier that in effect comprises several amplifiers that share pump energy derived from common pump sources 302, wherein amplification in each amplifier is achieved in more than one pass through the optical fibre arrangement 70.

FIGS. 35 and 36 depict amplifying optical devices wherein all the amplifying optical fibres 222 are joined together in series, the configurations being high power optical amplifiers. The amplifying optical fibres 222 in FIG. 35 are connected such that an optical signal passes in both directions through the optical fibre arrangement 70 while being amplified, whereas the amplifying optical fibres 222 in FIG. 36 are connected such that an optical signal passes in the same direction through the optical fibre arrangement 70 while being amplified. In certain instances it can be preferable to configure the amplifying optical device as shown in FIG. 36—for example it can provide a lower noise figure. In other cases it is preferable to configure the amplifying optical device as shown in FIG. 35—for example it can provide higher gain.

The embodiments are similar to the parallel optical amplifier shown in FIG. 34. The parallel optical amplifier of FIG. 34 can be configured as the high-power optical amplifier of FIG. 36 simply by connecting the amplifying optical fibres 222 together. It will therefore be appreciated that the parallel optical amplifier of FIG. 33 provides significant flexibility in its use. These configurations also further illustrate that the advantage of being able to individually separate the pump optical fibres 221 and the amplifying optical fibres 222 clearly increases as the numbers of pump optical fibres 221 and amplifying optical fibres 222 increases.

FIGS. 33 to 36 indicate the use of multiple pump optical sources 302. These embodiments can operate with a single pump optical source 302. However, the use of multiple pump optical sources 302 provides pump redundancy and is therefore preferable in certain applications where additional reliability is desired.

Figure 37:
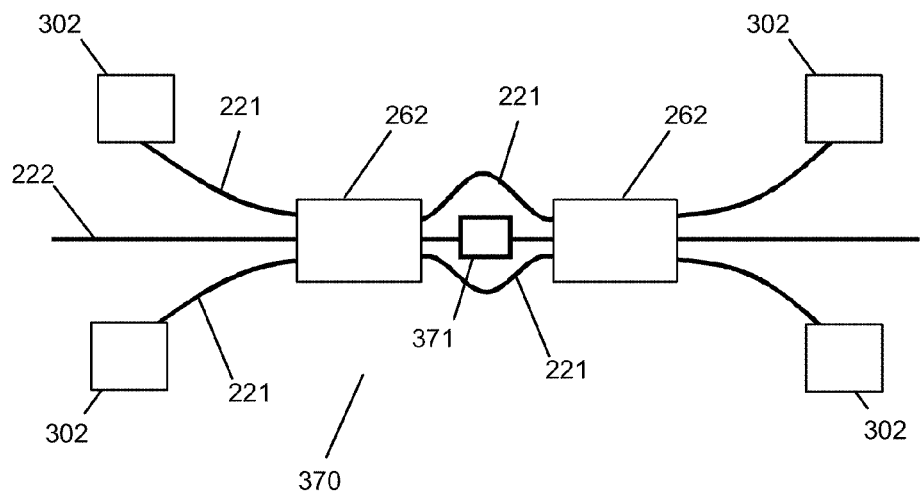
FIG. 37 depicts an amplifying optical device according to the present invention and including an optical element.

FIG. 37 depicts an amplifying optical device 370 which includes an optical element 371 inserted along the length of the amplifying optical fibre 222, the optical element 371 comprising at least one of a polarizer, an isolator, a circulator, a grating, an optical fibre Bragg grating, a long-period grating, an acousto-optic modulator, an acousto-optic tunable filter, an optical filter, a Kerr cell, a Pockels cell, a dispersive element, a non-linear dispersive element, an optical switch, a phase modulator, a Lithium Niobate modulator, or an optical crystal.

The amplifying optical device 370 can be considered to be either a single amplifying optical device containing the optical element 371, or two amplifying optical devices connected together via the optical element 371. The amplifying optical device 370 can also comprise the coating 262.

The amplifying optical device 370 can be constructed from an optical fibre arrangement 70 in which the amplifying optical fibre 222 can be individually separated by pulling from the remaining pump optical fibres 221, thus facilitating the insertion of the optical device 370. This is an advantageous feature that has particular benefit in the design and manufacture of a range of optical fibre amplifiers and lasers, since it simplifies the problem of adding more flexibility into the design of optical amplifiers and lasers.

Figure 38:
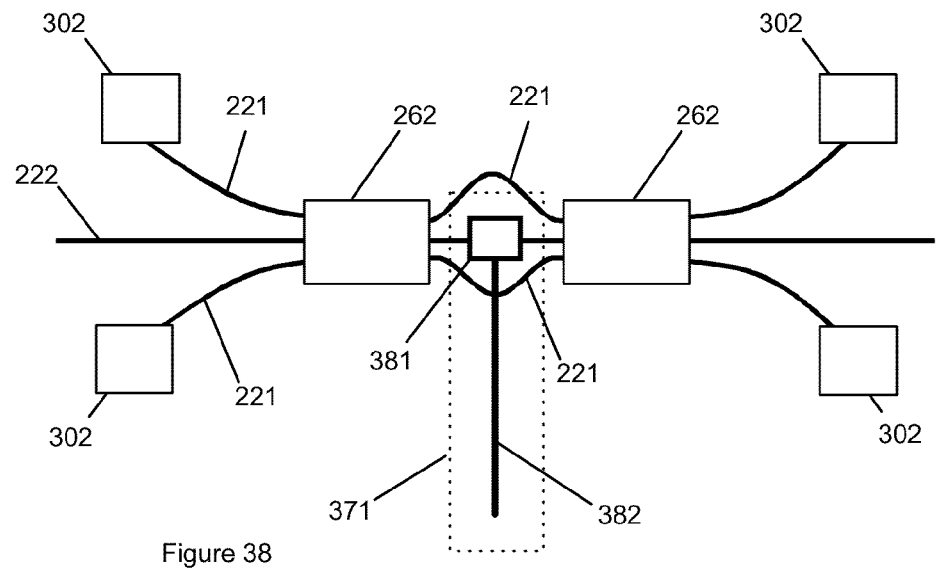
FIG. 38 depicts an amplifying optical device according to the present invention in which the optical element is an optical fibre Bragg grating.
Figure 39:
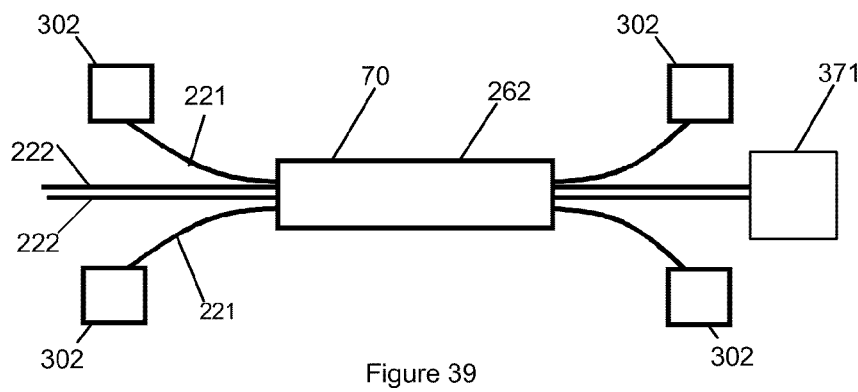
FIG. 39 depicts an amplifying optical device according to the present invention in which the optical element connects two amplifying optical fibres.

FIG. 38 depicts an embodiment of the amplifying optical device of FIG. 37 in which the optical element 371 is an optical fibre Bragg grating 382, and optical energy propagating in the amplifying optical fibre 222 is coupled into the optical fibre Bragg grating 382 via an optical circulator 381. The optical fibre Bragg grating 382 can be one or both of a gain-flattened grating and a dispersion compensating grating. These embodiments of the present invention have particular application in telecommunication systems. By gain flattening, we mean that the fibre grating compensates for the spectral variation in the optical gain provided by the amplifying optical fibre 222. FIG. 39 depicts an amplifying optical device in which the optical element 371 connects two amplifying optical fibres 282.

Figure 40:
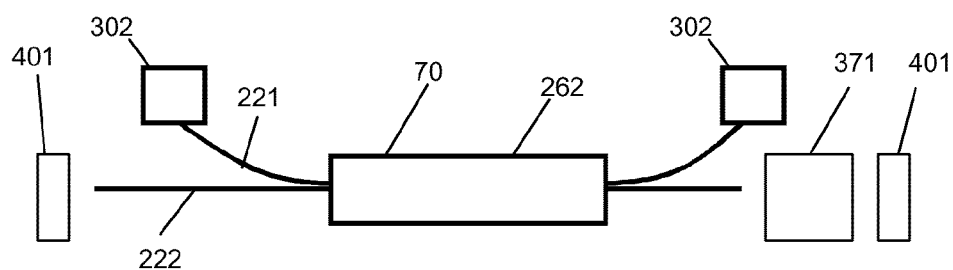
FIG. 40 depicts an amplifying optical device according to the present invention in which an optical element and a reflecting device are configured to reflect optical energy to the same amplifying optical fibre.

FIG. 40 depicts an amplifying optical device in which the optical element 371 and a reflecting device 401 is configured to reflect optical energy being emitted from the amplifying optical fibre 222 back into the same amplifying optical fibre 222. The reflecting device 401 can be a mirror or an optical fibre Bragg grating. It is to be appreciated that the amplifying optical device shown in FIG. 40 can be configured as a laser by adding the second reflecting device 401 as shown. The laser can be configured as a Q-switched or a mode-locked laser.

Figure 41:
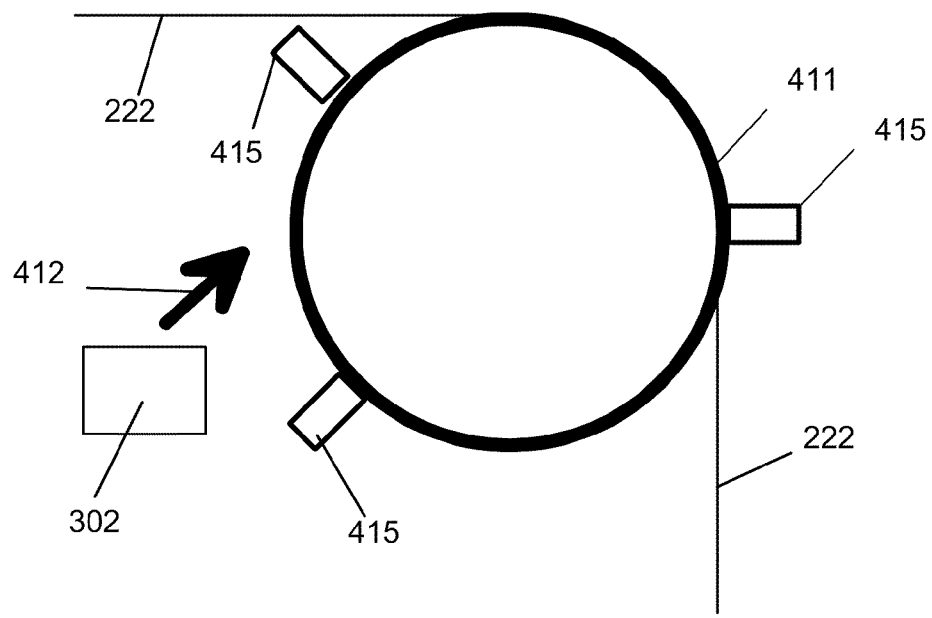
FIG. 41 depicts an amplifying optical device according to the present invention in which an amplifying optical fibre is configured in a coil.

FIG. 41 depicts an amplifying optical device comprising a single amplifying optical fibre 222 configured as a coil 411 such that at least two adjacent turns of the single amplifying optical fibre 222 are in optical contact with each other. Optical pump power 412 can be coupled into the amplifying optical device by side illumination from at least one optical pump source 302 as shown in FIG. 41, or by utilizing one of the prior art methods described in prior art FIGS. 1 to 5.

The amplifying optical fibre 222 is preferably an unclad optical fibre that can be either single-mode or multimode, and have a circular or non-circular cross-section.

The coil 411 can be supported by at least one support 415. The support 415 can be a ceramic, glass or silica rod, tube, cylinder, or bead, epoxied or otherwise bonded to the coil 411. The support 415 can be a support means. The coil 411 can be enclosed within an enclosure, which can be sealed and evacuated, or filled with inert gas such as nitrogen or argon.

Figure 42:
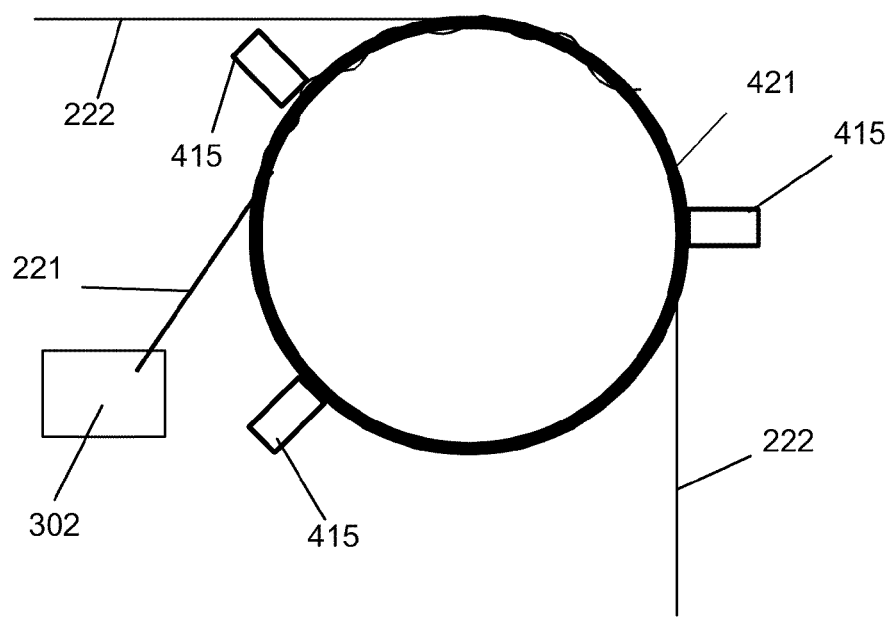
FIG. 42 depicts an amplifying optical device according to the present invention in which an amplifying optical fibre is configured in a coil and including a pump optical fibre.
Figure 43:
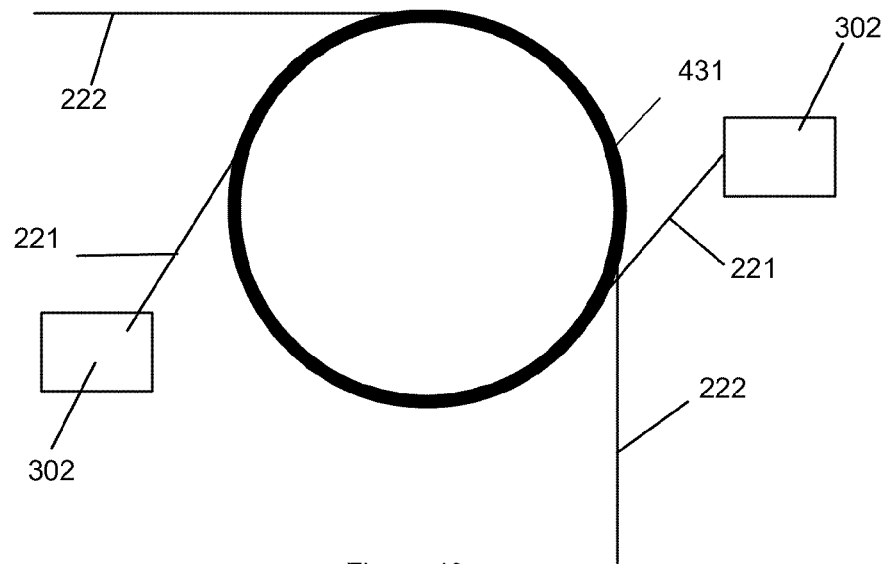
FIG. 43 depicts an amplifying optical device according to the present invention in which an amplifying optical fibre and multiple pump optical fibres are configured in a coil.

FIG. 42 depicts an amplifying optical device comprising a single amplifying optical fibre 222 configured as a coil 421 such that at least two adjacent turns of the single amplifying optical fibre 222 are in optical contact with each other, and including at least one pump optical fibre 221 disposed with respect to the coil 421 of amplifying optical fibre 222 so that the pump optical fibre 221 touches the amplifying optical fibre 222 along at least a respective portion of its length. As shown in FIG. 43, the amplifying optical device can comprise a plurality of pump optical fibres 221 to form a coil 431. The amplifying optical fibre 222 and the pump optical fibres 221 are shown laying in a clockwise direction.

Figure 44:
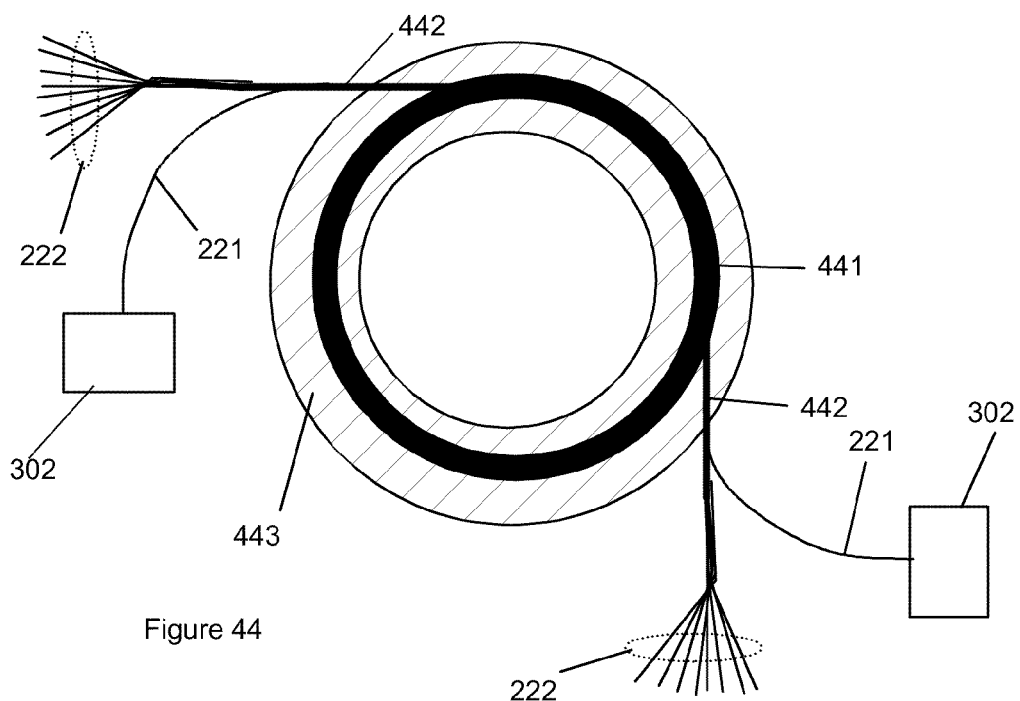
FIG. 44 depicts an amplifying optical device according to the present invention in which multiple amplifying optical fibres are configured in a coil.

The amplifying optical device can comprise a plurality of amplifying optical fibres 222 as shown in FIG. 44. This is conveniently constructed by twisting the amplifying optical fibres 222 and at least one pump optical fibre 221 together to form an interim cable 442, and coiling the interim cable 442 to form a coil 441. The amplifying optical device of FIG. 44 is a parallel optical amplifier with the performance advantages of the amplifying optical device described with reference to FIG. 33.

The coils 411, 421, 431 and 441 can be potted in a polymer 443 as shown in FIG. 44. The polymer 433 preferably has a refractive index lower than the refractive indices of the claddings of the amplifying optical fibres 222 and the pump optical fibre 221. The polymer 443 can be a silicone rubber.

Figure 45:
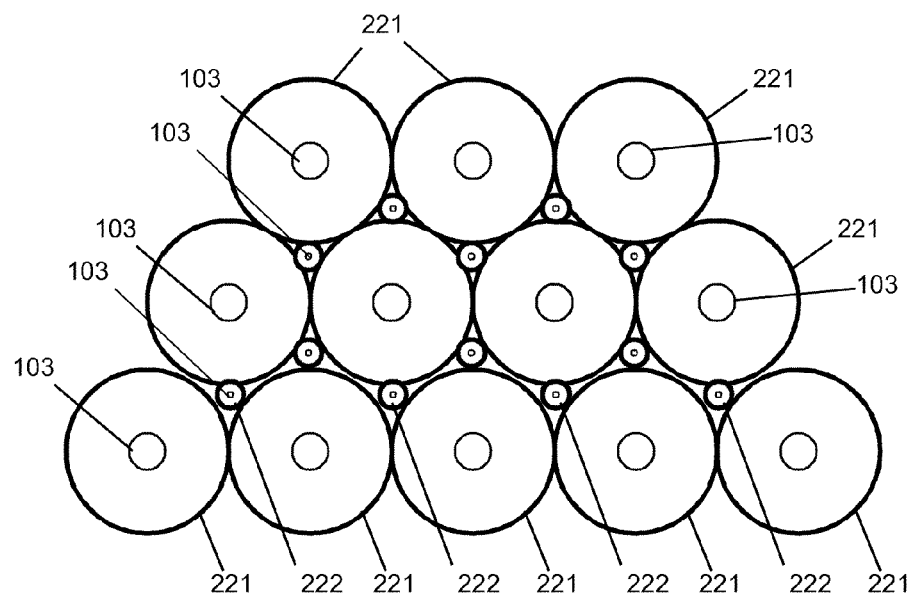
FIG. 45 depicts an amplifying optical device according to the present invention in which at least one pump optical fibre is disposed in interstitial gaps between turns of at least one amplifying optical fibre.

The pump optical fibre 221 depicted in FIGS. 42 to 44 can have a diameter much less than the diameter of the amplifying optical fibre 222. Advantageously, the pump optical fibre 221 can be disposed in interstitial gaps between turns of the amplifying optical fibre 222 as illustrated in FIG. 45. The pump optical fibre 221 shown in FIG. 45 can either be a single pump optical fibre or be many pump optical fibres—a configuration that has particular applicability to high-power amplifiers and lasers as well as providing a means to achieve pump redundancy.

The pump optical fibre 221 can be formed from a material having a lower melting point than the material of the amplifying optical fibre 222.

The coils 421, 431 and 441 in which one or more pump optical fibres 222 are attached can be considered to be a pumped coil. The number of pump optical fibres 221 can be between 1 and 100, or even higher for applications involving amplifiers and lasers requiring high power outputs (>1 W to 5 W). The pump optical fibre 221 is preferably a multimode fibre fabricated either from silica or soft glass. For certain applications, it is convenient to have the pump optical fibre 221 smaller than the amplifying optical fibre 222, i.e., in the range 5 µm to 100 µm. For other applications, the pump optical fibre 221 should be of a comparable size or even much larger than the amplifying optical fibre 222. For example, when coupling to a diode bar, the pump optical fibre 221 can conveniently be in the region 100 µm to 1000 µm—the larger dimension representing a glass rod which can be moulded into the pumped coil. The coil turns in the pumped coil can be melted to each other. The diameter of the pumped coil can be in the range 10±1000 times greater than the diameter of the amplifying optical fibre 222.

Figure 46:
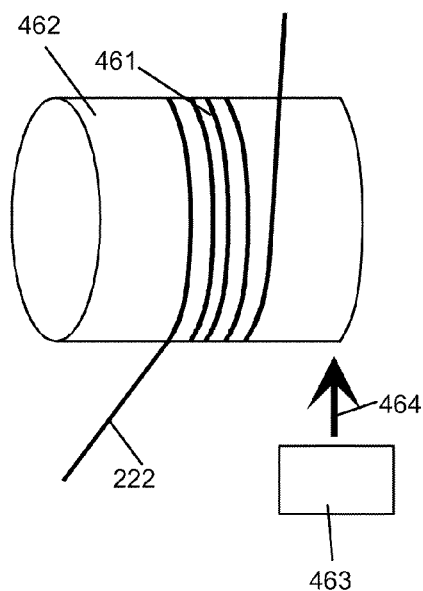
FIG. 46 depicts an amplifying optical device according to the present invention in which an amplifying optical fibre is wound around a former.

FIG. 46 depicts a coil 461 comprising amplifying optical fibre 222 wound on a light transmitting former 462. Also shown is a pump arrangement 463 for launching pump light 464 into the former 462. The pump arrangement 463 can be the pump source 302. The amplifying optical fibre 222 has a longitudinally extending outside surface that is in optical contact with the former 462 along at least a portion of the longitudinally extending outside surface. The former 462 can be a glass tube, a glass rod, a glass cylinder, or a glass hoop.

Figure 47:
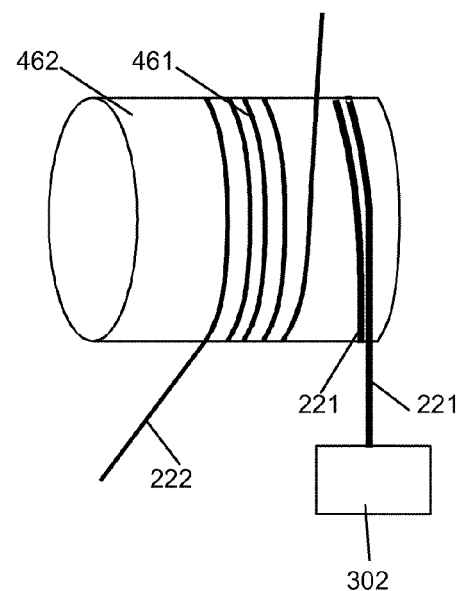
FIG. 47 depicts an amplifying optical device according to the present invention in which an amplifying optical fibre and a pump optical fibre are wound around a former.

FIG. 47 depicts a pump optical fibre 221 in optical contact with the former 462, the pump optical fibre 221 being connected to a pump source 302. In use, pump light will be coupled from the pump optical fibre 221 into the amplifying optical fibre 222 via the former 472.

In configurations wherein the former 462 is a hoop, the coils can be conveniently wound around the hoop in a toroidal winding. The glass can be a soft glass, or can be silica or doped silica glass. Preferably, the refractive index of the glass is substantially the same as the refractive index of the cladding of the amplifying optical fibre 222 and the pump optical fibre 221.

Figure 48:
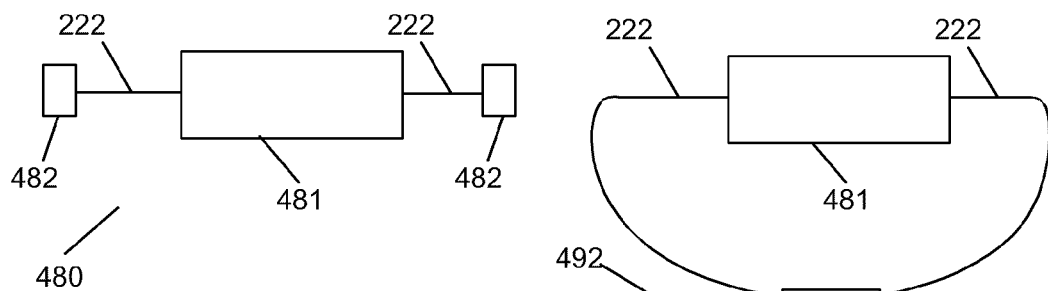
FIG. 48 depicts a laser according to the present invention.
Figure 49:
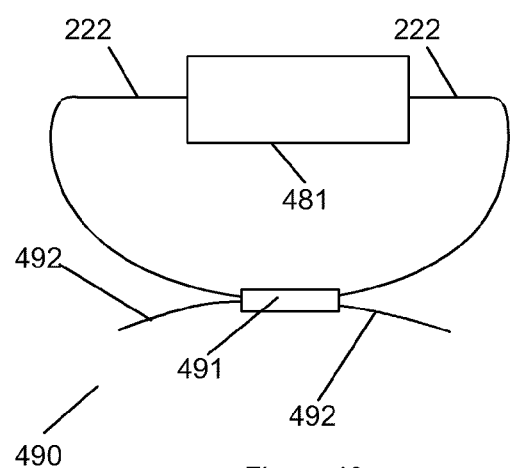
FIG. 49 depicts a laser according to the present invention configured as a ring laser.

FIG. 48 depicts a laser 480 constructed from an amplifying optical device 481 by providing an optical feedback arrangement 482 for promoting light generation within the laser. The amplifying optical device 481 can be one of the amplifying optical devices described with reference to FIGS. 30 to 47. The optical feedback arrangement 482 can comprise two reflecting devices comprising at least one of a mirror, a dichroic mirror, a coupler, an optical fibre coupler, and/or an optical fibre Bragg grating. The optical feedback arrangement 482 can be configured such that the laser 480 is a ring laser 490 as shown in FIG. 49. Here, the optical feedback arrangement 482 is shown as a coupler 491 to provide two output ports 492. If unidirectional operation is required, an optical isolator can be added into the ring according to prior art.

Figure 50:
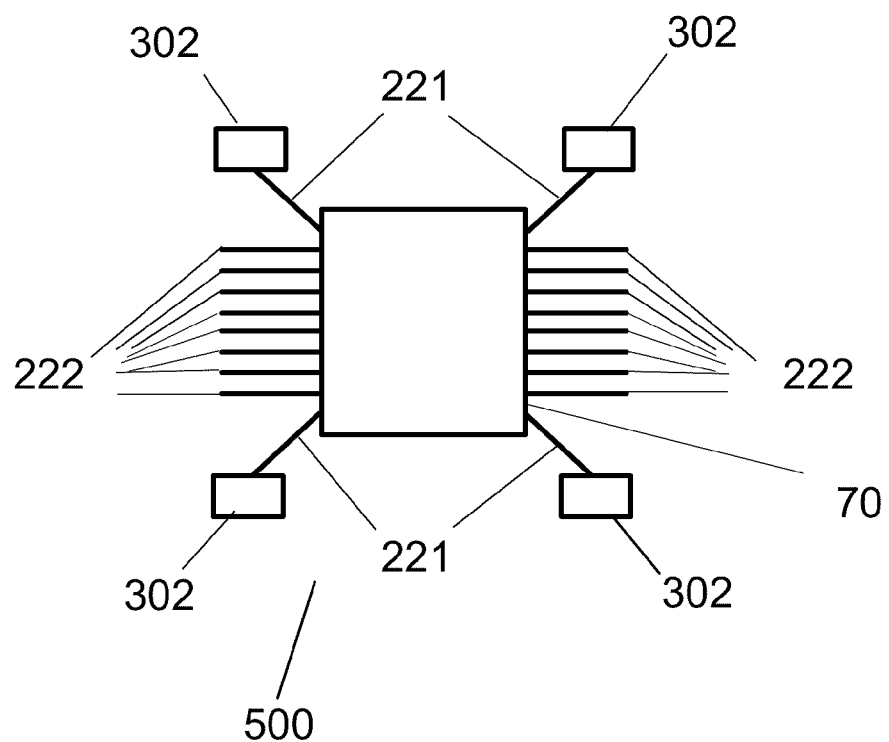
FIG. 50 depicts an optical amplifier according to the present invention.

FIG. 50 depicts a preferred embodiment for an optical amplifier 500 configured as a parallel optical amplifier, which will be referred to in the following description to demonstrate the advantages of such a parallel amplifier in optical networks. The amplifier 500 is particularly advantageous for amplifying optical devices such as shown in FIGS. 30 to 47. The amplifier 500 comprises at least one pump source 302 for supplying pump energy, and a plurality of amplifying optical fibres 222. The amplifier 500 preferably comprises a plurality of pump optical fibres 221—although as seen in FIG. 41, this feature is not strictly necessary, and is not meant to limit either this embodiment or the embodiments that will be described in the following figures where the amplifier 500 is referenced. The underlying feature is that the pump energy provided by the pump source 302 (or any other pump arrangement) is shared between the plurality of the amplifying optical fibres 222 by virtue of the optical contact of the optical fibre sections 71,72 (not shown in FIG. 50). The amplifier 500 can either be used for single-pass amplification, or for multi-pass amplification by connecting one amplifying optical fibre 222 to another amplifying optical fibre 222 as described in the description relating to FIGS. 34 to 36. The amplifier 500 provides a number of substantially independent amplification channels that can simultaneously amplify signals at the same wavelength or at different wavelengths.

The pump source 302 preferably contains at least one semiconductor laser diode, and there is preferably more than one pump source 302 connected to each of the ends of the pump optical fibre 221. The semiconductor laser diode can be a broad stripe laser diode or a diode bar. There is preferably more than one pump optical fibre 221 connected to additional pump sources 302. These features are preferred to increase pump redundancy, to increase the saturated power available from each amplifying optical fibre 222, and to amortize the investment of the relatively expensive semiconductor laser diodes over several amplifying optical fibres 222. This latter feature is especially relevant in applications requiring low-cost amplification, for example for application in metropolitan areas.

Figure 6:
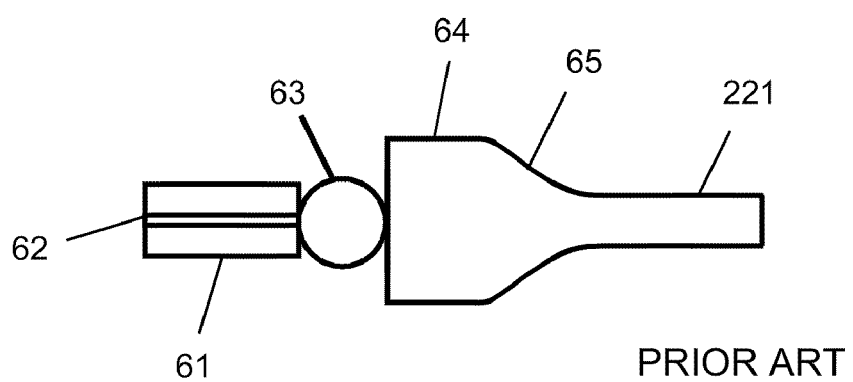
FIG. 6 is a diagram of a prior art pump coupling scheme.

FIG. 6 schematically illustrates a prior art technique for launching pump light from a laser diode 61 into the pump optical fibre 221. The pump light is emitted from an emission stripe 62 of the laser diode 61. As it has a much larger divergence in one dimension (vertically along the page as drawn), a cylindrical lens 63 formed as a piece of optical fibre is used to converge the pump light in this direction. The pump light is then launched into a fibre 64 in which at its end has a diameter of about 140-300 µm, but which is then tapered down in a taper 65 to about 80 µm for use in coupling to the pump optical fibre 221. The fibre 64 and the taper 65 can be constructed from the same optical fibre, or different optical fibres, and can be a part of the pump optical fibre 221. This technique can also be used to launch light into other types of optical fibre.

Figure 51:
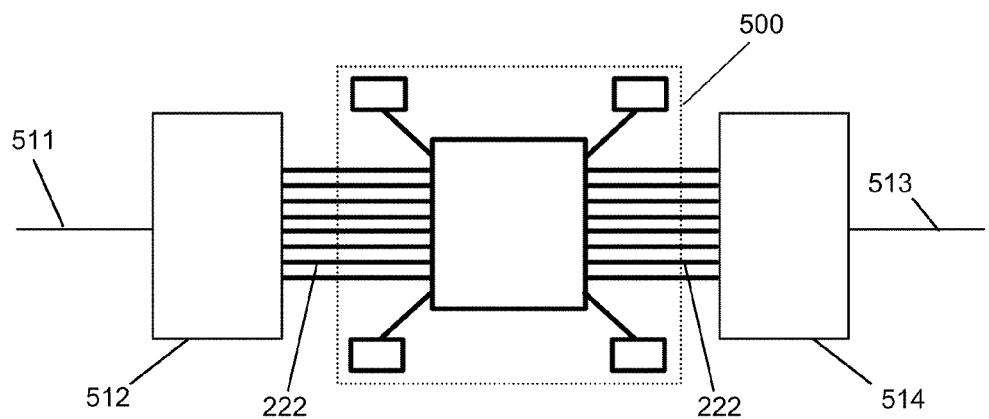
FIG. 51 depicts an amplifier according to the present invention comprising a first multiplexer.

FIG. 51 depicts an amplifier 510 comprising the amplifier 500, at least one input fibre 511, and a first multiplexer 512 connected to the input fibre 511. The amplifying optical fibres 222 are connected to the first multiplexer 512. The first multiplexer 512 can be a coupler dividing the power essentially equally between its outputs. The coupler can be constructed from optical fibre couplers or can be a planar-optical device having a single input and multiple outputs.

Figure 52:
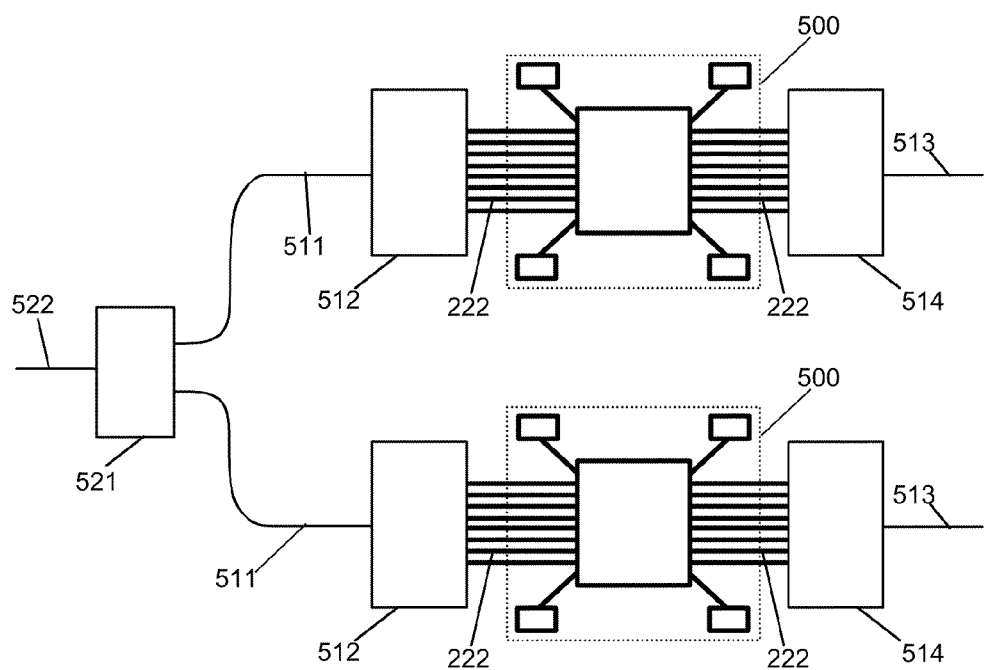
FIG. 52 depicts an amplifying optical arrangement according to the present invention.
Figure 61:
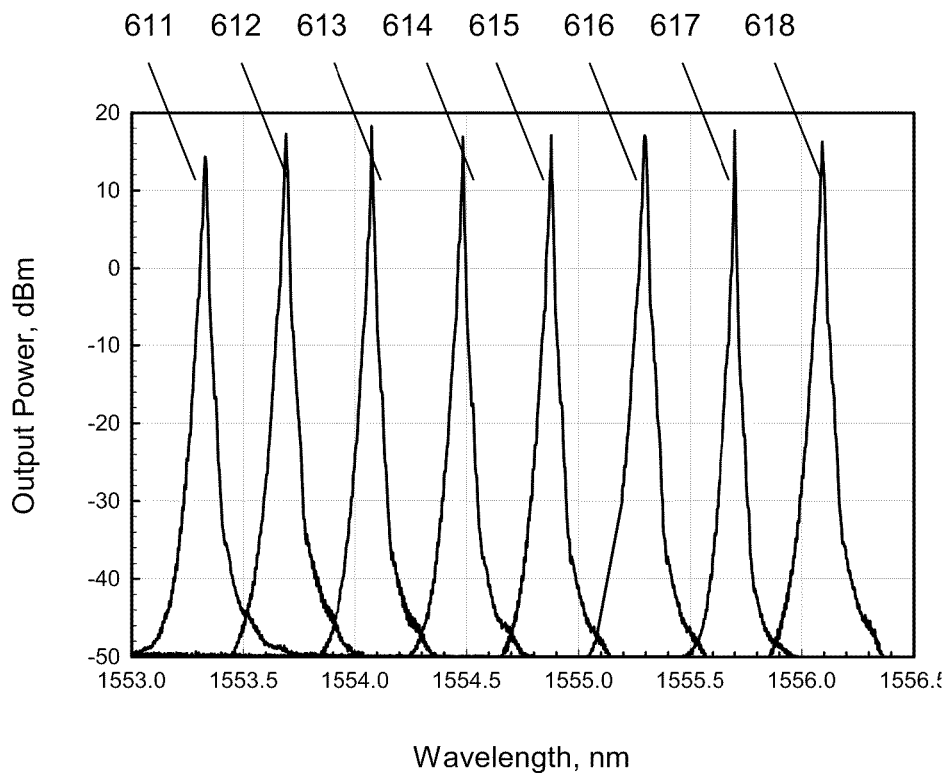

The first multiplexer 512 can be a wavelength division multiplexer as an arrayed waveguide grating AWG. The first multiplexer 512 can also be an add mulitplexer, a drop multipexer, or an add-drop multiplexer constructed from thin-film filters and/or optical fibre gratings. The first multiplexer 512 can be used to separate out wavelength channels input by the input fibre 511 such that each amplifying optical fibre 222 amplifies either different wavelength channels or groups of different wavelength channels. The separate wavelength channels can be combined into a single output port 513 using a coupler 514 as shown in FIG. 52. The coupler 514 can be a planar-optics coupler, one or more optical fibre couplers, a wavelength division multiplexer, an add mulitplexer, a drop multipexer, or an add-drop multiplexer constructed from thin-film filters and/or optical fibre gratings. FIG. 61 depicts eight wavelength channels 611 to 618 output by an amplifier. Wavelength channels 611 and 612 are adjacent and so are wavelength channels 613 and 614. It is preferable that each amplifying optical fibre 222 amplifies only a single one of the wavelength channels.

FIG. 52 depicts an amplifying optical arrangement comprising a plurality of amplifiers 500 and a plurality of first multiplexers 512, and including a second multiplexer 521 connected to each first multiplexer 312 and to an input port 522. The second multiplexer 521 can be an interleaver that directs adjacent wavelength channels to different ones of the first multiplexers 512 and hence to different ones of the amplifiers 500 or to a coupler that divides the input power between the two input fibres 511. The configuration with the interleaver is preferred. Thus referring to FIG. 61, it is preferred that one of the amplifiers amplifies channels 611, 613, 615 and 617 whilst the other amplifier amplifies channels 612, 614, 616 and 618.

Figure 53:
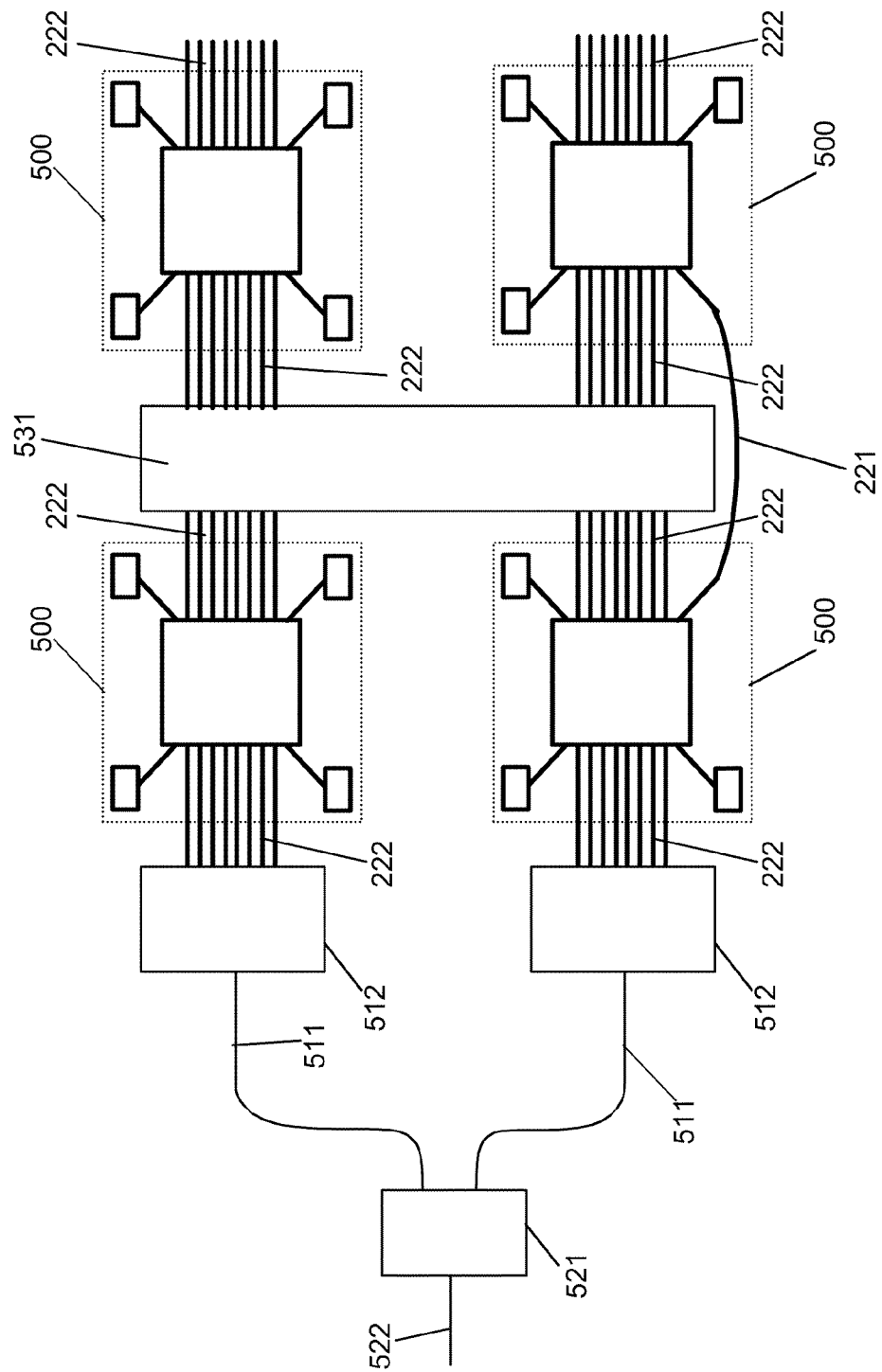
FIG. 53 depicts an amplifying optical arrangement according to the present invention comprising an optical device.

FIG. 53 depicts an amplifying arrangement comprising a plurality of amplifiers 500 and an optical device 531, the amplifying arrangement being configured such that the optical device 531 is connected to the amplifiers 500. The figure depicts one of the pump optical fibres 221 being shared by two of the amplifiers 500—thus saving on pump sources 302.

The optical device 531 can be an optical router, an add-drop multiplexer, an add multiplexer, a drop multiplexer, an optical switch, a polarize, an isolator, a circulator, a grating, an optical fibre Bragg grating, a long-period grating, an acousto-optic modulator, an acousto-optic tuneable filter, an optical filter, a Kerr cell, a Pockels cell, a dispersive element, a non-linear dispersive element, an optical switch, a phase modulator, a Lithium Niobate modulator, or an optical crystal. The optical device 531 can also be more than one of the above devices, either singly or in combination.

A preferred embodiment is where the optical device 531 is an optical router which comprises an optical switch configured such that optical signals output from one of the amplifiers 500 are routed to at least two more of the amplifiers 500.

The amplifying arrangements depicted in FIGS. 51 to 53 are particularly useful for reducing the granularity from an optical telecommunications network. This granularity occurs when a signal at a remote location is suddenly turned on. This signal propagates through the optical network and can induce instabilities in an amplifier. The ability to separate out the individual wavelength channels into individual wavelength channels or groups of wavelength channels, each being amplified separately in the amplifier 500 reduces the crosstalk inherent and instabilities which occur with prior art amplifiers, and does so in a cost effective manner.

Figure 54:
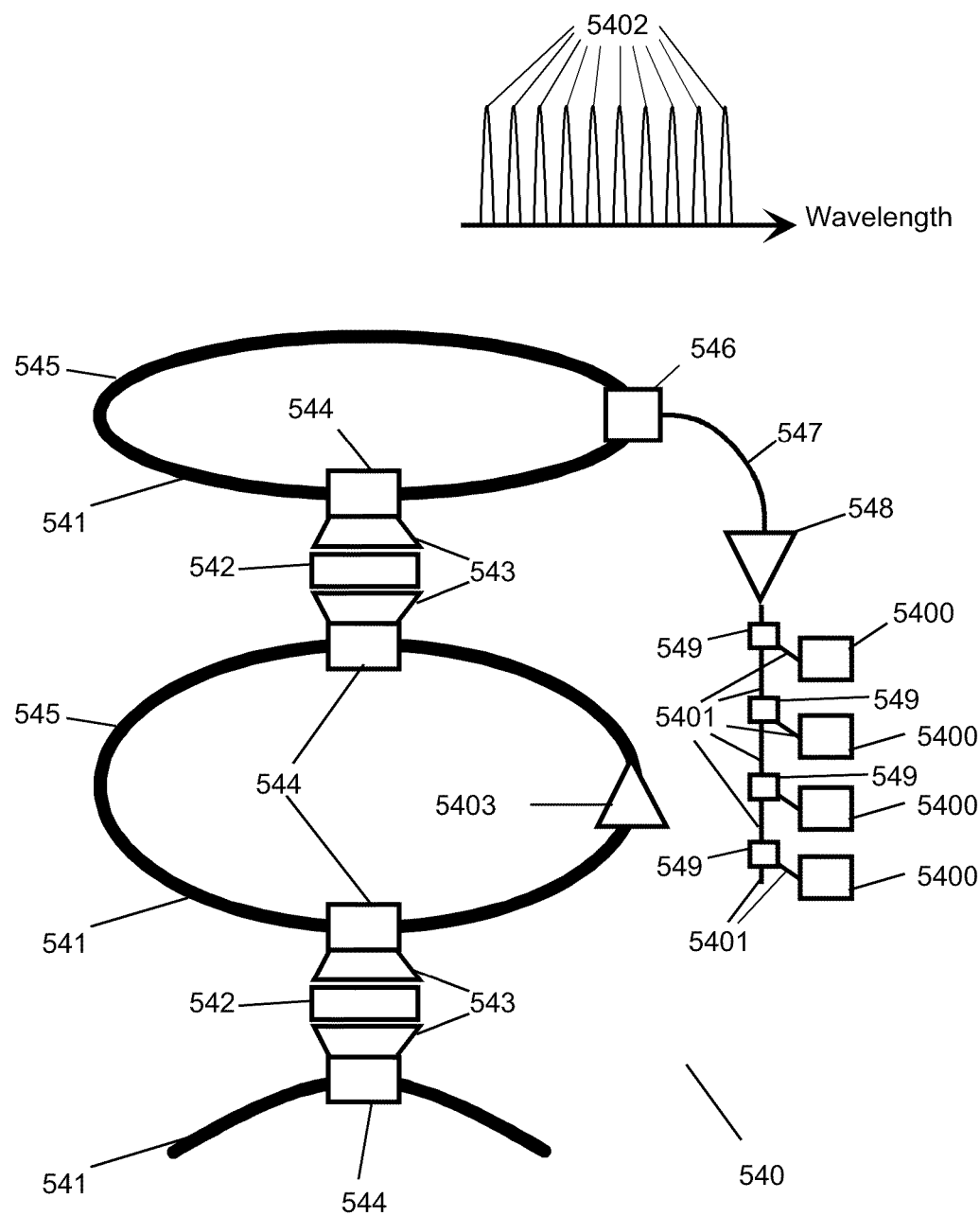
FIG. 54 depicts an optical network according to the present invention.

FIG. 54 depicts an optical network 540 comprising at least one first optical fibre 541 that can be configured in at least one ring 545. The network includes at least one multi-wavelength transmitter 542 comprising a plurality of signal sources (not shown) that can be distributed feedback lasers, either directly modulated or with external modulation. The multi-wavelength transmitter 542 outputs a plurality of telecommunication signals 5402 into the first optical fibre 541 via a multiplexer 543 and/or a first add/drop multiplexer 544, each telecommunication signal 5402 having a different wavelength. An amplifier 5403 is shown in the ring 545.

A second add/drop multiplexer 546 can be included to remove at least one telecommunication signal 5402 from the first optical fibre 541 and transmit the telecommunication signal 5402 via a second optical fibre 547 to at least one location 5400. An amplifier 548, a coupler 549 and a third optical fibre 5401 can may be included.

The telecommunication network 540 is not intended to be limited to the arrangement shown in FIG. 54. There are many different topologies and architectures being explored today, including ring architectures and mesh architectures. However, the telecommunication network will, for the foreseeable future, always include the multi-wavelength transmitter 542 and the first optical fibre 541.

The amplifier 5403 can be the amplifying optical device shown in FIG. 38 that includes an optical fibre Bragg grating to condition at least one telecommunication signal 5402. The amplifier 5403 be the amplifier 500. The first add/drop multiplexer 544 can include an amplifier according to FIG. 51 or an amplifying arrangement according to FIG. 52 or FIG. 53. The second add/drop multiplexer 546 can may include an amplifier according to FIG. 51 or an amplifying arrangement according to FIG. 52 or FIG. 53.

The amplifier 548 can may be an amplifying optical device according to any one of FIGS. 30 to 39, 41 to 44, 46, 47, an amplifier according to FIG. 50 or FIG. 51, or can include an amplifying arrangement according to FIG. 52 or FIG. 53. It will be noted that the amplifier 548 can be required to boost the telecommunication signal 5402 significantly in order that a signal with adequate signal to noise ratio is received at the location 5400.

The invention therefore provides a method to reduce the granularity in an optical telecommunications network comprising providing at least one of the amplifiers shown in FIG. 50 and FIG. 51, and/or at least one of the amplifying optical arrangements shown in FIG. 52 or FIG. 53 in at least one location within the network.

Figure 55:
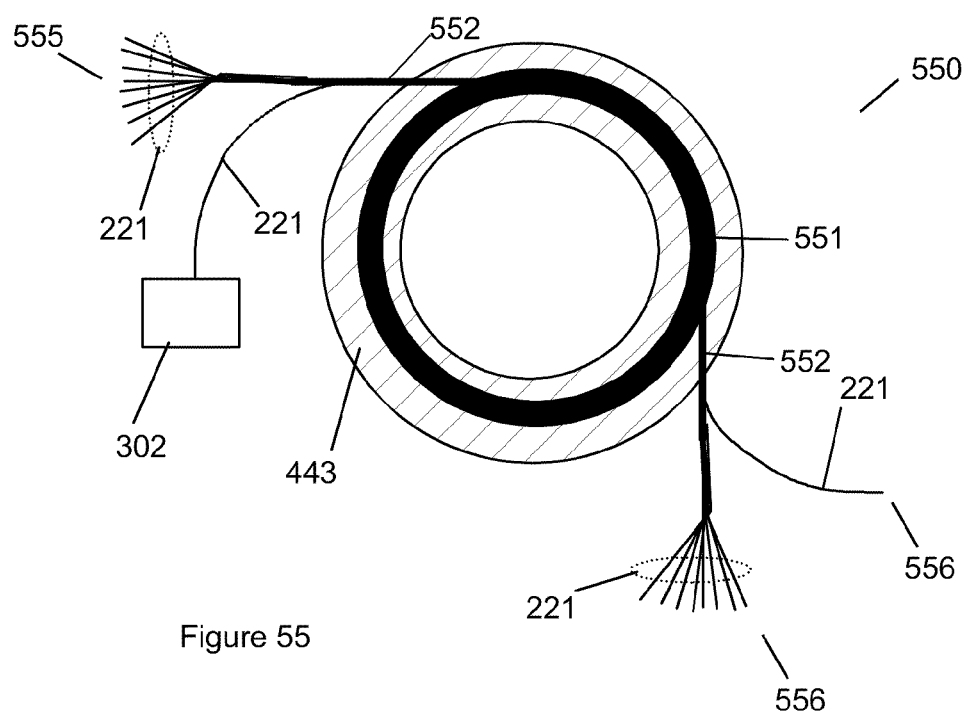
FIG. 55 depicts a power splitter according to the present invention.

FIG. 55 depicts a power splitter 550 comprising at least one pump source 302 and an optical fibre arrangement 70 comprising a plurality of pump optical fibres 221 each having an input 555 and an output 556. The plurality of pump optical fibres 221 is configured in a coil 551, wherein at least one of the pump optical fibres 221 is connected to the pump source 302.

Provided that each of the pump optical fibres 221 has the same diameter, the optical power provided by the pump optical source 302 is divided approximately equally between the pump optical fibres 221 within the coil 551. The optical power provided by each output 556 of the pump optical fibres 221 can be predetermined by selecting the relative diameters of the pump optical fibres 221.

The pump optical fibres 221 can be twisted or can be left untwisted. The coil 551 can be constructed by forming an interim cable 552. The coil 551 can be potted in a polymer 443. The polymer 433 preferably has a refractive index lower than the refractive indices of the claddings of the pump optical fibres 221. The polymer 443 can be a silicone rubber.

Figure 56:
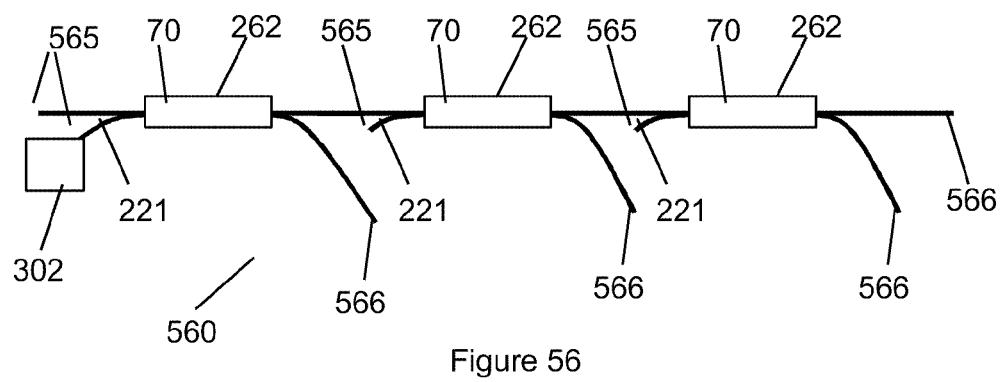
FIG. 56 depicts a serial power splitter according to the present invention.

FIG. 56 depicts a power splitter 560 comprising at least one pump source 302 and at least one optical fibre arrangement 70 comprising a plurality of pump optical fibres 221 each having an input 565 and an output 566, wherein at least one of the pump optical fibres 221 is connected to the pump source 302. By varying the length of the optical fibre arrangement 70, the power splitting ratio at the output of the optical power splitter 550 can be set to a predetermined value. The pump optical fibres 221 can be twisted or can be left untwisted.

Advantageously, the optical fibre arrangement 70 can be constructed from an optical fibre arrangement in which a first optical fibre is individually separable from a second optical fibre. For example, optical fibre arrangements based on the optical fibre 277 or the optical fibre 284. Such an approach provides an advantageous solution for sharing pump energy from a single pump source amongst a plurality of amplifiers, particularly since many optical power splitters can be fabricated from a typical production quantity of the optical fibre 277 and the optical fibre 284.

Figure 57:
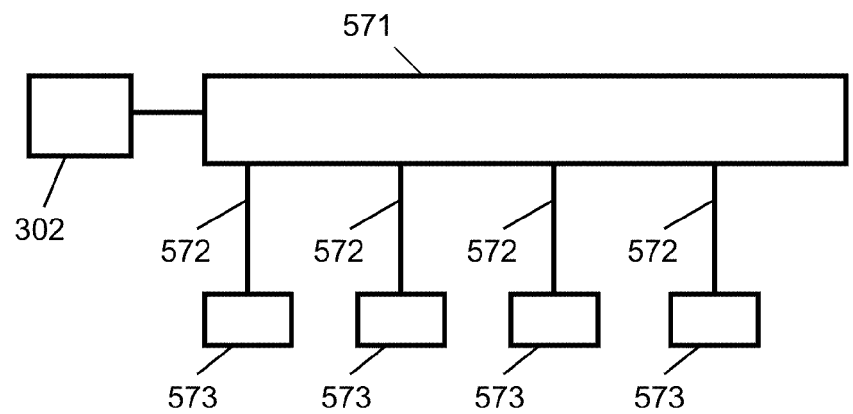
FIG. 57 depicts a power splitter and amplifiers according to the present invention.

FIG. 57 depicts optical pump power from a pump source 302 being divided by a power splitter 571 connected to a plurality of optical amplifiers 573 by output fibres 572. The output fibres 572 can be pump optical fibres 221. The power splitter 571 can be the power splitter 550 or the power splitter 560. The arrangement depicted in FIG. 57 provides a cost-effective and reliable way of sharing output from a single pump source amongst several optical amplifiers.

Selected detailed examples will now be presented of how pump light can be injected into amplifying optical fibres and converted into signal light. The results will be compared to a prior-art, double clad fibre laser.

Example I

This Example is based on the configuration depicted in FIG. 32. The amplifying optical fibre 222 has an outer diameter (OD) of 200 µm and a core diameter of 10 µm. The core is single-moded at the signal wavelength and made of Er3+/Yb3+-activated aluminosilicate glass. The pump absorption cross section at 980 nm is 20·10-25 cm2. The Yb3+ concentration is 9000 particles per million (ppm). A 10 m long fibre absorbs ~90% of launched pump power. The pump power is provided by 4 laser diodes with rated output power of 2 W. Using the simple launching scheme shown in FIG. 32 one can launch nearly 90% of pump power into the fibre amplifier Assuming 35% efficiency the saturated output power of the example is in the region of 2.5 W. In many applications however required output power is 1 W which can be achieved with only 2.9 to 3 W of pump power, i.e. by using only two pump diodes. Thus by down-rating all four pump diodes to 800 mW one can achieve the required level of the output power. In the case of failure of one of the pump diodes, pump power from the rest is increased to the level required to obtain a pre-determined level of the output power. Thus this system has protection against pump diode failure.

Example II

This Example is a mode-locked cladding pumped fibre laser with repetition rate frequency in the region of 50-200 MHz. The laser is based on the two fibre arrangement shown in FIG. 40. The amplifying optical fibre has an OD of 80 µm, core diameter of 15 µm and signal NA of 0.07. The core is single-moded at the signal wavelength and made of Yb3+-activated aluminosilicate glass. The pump absorption cross section at 980 nm is 20 X·10$^{-25}$ cm2, which implies an Yb3+ concentration of 1000 particles per million (ppm). A 1 m long fibre absorbs approximately 90% of launched pump power. The pump power is provided by 2 laser diodes with rated output power of 2 W.

With an appropriate mode-locking technique (either passive or active) the laser is capable of generating 1 ps pulses at repetition rate of 100 MHz and average power of 1 W and peak power in excess of 10 kW. Mirrors 401 form an optical resonator for the signal.

An advantage of using this configuration is that the signal and pump are spatially separated and thus high pulse peak power will not result in damage of pump diodes.

Example III

This Example is a multi-fibre arrangement including two or more pump diodes pumping simultaneously several amplifying optical fibres as shown in FIGS. 33 to 36. The amplifying optical fibres have an outer diameter (OD) of 100 µm and a core diameter of 10 µm. The core is single-moded at the signal wavelength and made of Er3+/Yb3+-activated aluminosilicate glass. The pump absorption cross section at 980 nm is 20·10$^5$ cm$^2$, which implies an Yb3+ concentration of 9000 particles per million (ppm). A 5 m long fibre absorbs approximately 90% of launched pump power. The pump power is provided by 4 laser diodes with rated output power of 2 W. Using the simple launching scheme shown in FIG. 6 one can launch nearly 90% of pump power into the fibre amplifier. Assuming 35% efficiency the saturated output power of the Example is in the region of 1 W from each channel. It should be understood that total amount of output power available from all channels remains approximately the same so increasing the number of channels will results in decreasing of the output power from an individual channel. It should be also understood that it is preferred in a transmission system that optical power in any one channel should not exceed 10 to 15 mW to avoid non-linear effects. Thus if the number of doped fibres is equal to the number of channels, then the output power from the individual channels will be below 20 mW. The present invention also makes it possible to increase the number of amplifying optical fibres to 16 or even 32 with the output power available from each channel in the region 50-100 mW. To better appreciate the advantages of the coiled amplifying devices of FIGS. 41 to 47, some detailed examples of how pump light can be injected into the coil and converted to signal light are presented, and compared to the results obtainable with a prior-art, double-clad fibre laser.

Example IV

This Example is a laser structure formed by coiling a fibre with a longitudinal pump absorption of 50 dB/m at 975 nm. The fibre has an outside diameter ("OD") of 50 µm and a core diameter of 10 µm. The core is single-moded at the signal wavelength and made of $Yb^{3+}$-activated aluminosilicate glass. The pump absorption cross-section is $20 \times 10^{-25}$ m$^2$, which implies an $Yb^{3+}$-concentration of $1.44 \times 10^{26}$ ions/m$^3$ or about 1.6% by weight. A 10 m long fibre is coiled to a torus of 10 cm diameter, i.e., with approximately 30 turns and with a cross-sectional area of approximately 300×300 µm$^2$. (Thus, the thickness of the torus is similar to the thickness of a typical double-clad fibre.) The output of three laser diodes, each at 2

W and with a 100 μm wide stripe are injected into the torus with an overall efficiency of 75% via pump couplers made with 125 μm diameter fibres and equally spaced along the torus. We estimate that the numerical aperture of the pump beam injected into the torus is 0.2. The couplers are thus spaced by 10 cm. In order to absorb the pump, the beam should propagate approximately 20 cm (10 dB absorption) around the loop, and pass by another pump coupler a single time. We have estimated the excess loss for light propagating in the coil upon passing a pump coupler is negligible due to high numerical aperture of the coil and low numerical aperture of the pump optical fibre. Thus, the design allows essentially the entire pump power to be efficiently converted to signal.

Example V

This Example is a laser structure formed by coiling a fibre with longitudinal pump absorption of 2 dB/m at 975 nm. The fibre has an OD of 250 μm and a core diameter of 10 μm. The core is single-moded at the signal wavelength and made of $Yb^{3+}$-activated aluminosilicate glass. The pump absorption cross-section is $20 \times 10^{-25}$ $m^2$, which implies an $Yb^{3+}$-concentration of $1.44 \times 10^{26}$ ions/$m^3$ or about 1.6% by weight. A 200 m long fibre is coiled to a torus of 10 cm diameter, i.e., with approximately 600 turns and with a cross-sectional area of about 6×6 $mm^2$. The output of 10 laser diode sources, each at 20 W and coupled to a fibre with 300 μm diameter and with an NA of the beam of 0.2 are injected into the torus with an overall efficiency of 75% via pump couplers which are grouped into pairs and equally spaced along the torus. It is estimated that the numerical aperture of a pump beam injected into the torus is 0.3. The couplers are thus spaced by 6 cm. In order to absorb the pump, the beam should propagate approximately 5 m (10 dB absorption) around the loop, and in this distance pass by a pump coupler 80 times. Since the pump couplers are a small perturbation on a thick torus, the excess loss for light propagating in the coil upon passing a pair of pump couplers will be small, in the region of 0.05 dB or 1%. Thus, with this design, approximately 70% of the pump power will be usefully absorbed by the $Yb^{3+}$, while the other 30% will be scattered by the pump couplers.

Example VI

This Example is a laser structure formed by coiling a fibre with longitudinal pump absorption of 0.1 dB/m at 975 nm. The fibre has an OD of 1 mm and a core diameter of 10 μm. The core is single-moded at the signal wavelength and made of $Yb^{3+}$-activated aluminosilicate glass. The pump absorption cross-section is $20 \times 10^{-25}$ $m^2$, which implies $Yb^{3+}$-concentration of $1.15 \times 10^{26}$ ions/$m^3$ or about 1.3% by weight. A 100 m long fibre is coiled to a torus of 10 cm diameter, i.e., with approximately 300 turns and with a cross-sectional area of approximately 17×17 $mm^2$. The output of 10 laser diode sources, each at 20 W and coupled to a fibre with 300 μm diameter and with an NA of the beam of 0.2 are injected into the torus with an overall efficiency of 75% via pump couplers which are grouped into pairs and equally spaced along the torus. We estimate that the numerical aperture of a pump beam injected into the torus is 0.3. The couplers are thus spaced by 6 cm. In order to absorb the pump, the beam should propagate approximately 100 m (10 dB absorption) around the loop, and in this distance pass by a pump coupler 1700 times. Because of the very small area of the pump coupler fibre compared to the torus, we estimate the excess loss for light propagating in the coil upon passing a pair of pump couplers to 0.1% (0.005 dB). Thus, approximately 55% of the pump power injected into the torus will be absorbed by the $Yb^{3+}$-ions, and 45% will be scattered by the pump couplers.

Example VII

This Example is a fibre laser operating at 975 nm. It is well known that Yb ions in silica glass have a large emission cross-section at 975 nm which makes a Yb-doped fibre laser a candidate to replace conventional pigtailed laser diodes operating at this wavelength. Due to three level nature of the Yb-doped fibre laser at this wavelength the pump power intensity at the far end of the laser should be in the region of $3 \cdot 10^4$ $W/cm^2$ in order to ensure no signal absorption along the laser. This means that for a double clad fibre with a 200 μm outer diameter, the pump-through power will be 10 W, which makes such a laser unpractical. Reducing the fibre OD to 20 μm and transparency power to 100 mW could make this laser practical from the required pump power point of view but fibre handling would be extremely difficult. Therefore all previous attempts to realize 975 nm fibre laser based on double clad fibre have had very limited success. As mentioned above, an advantage of the present configuration is that the pump intensity inside the laser can be made very high provided pump optical fibres are thin enough, which makes a high power 976 nm fibre laser feasible. One possible configuration is based on 4 W pump diodes operating at 915 nm pigtailed to 200 μm fibre. The fibre is silica rod with silicone rubber cladding. In reasonably short length the pump power NA can be kept as low as 0.1 which allows preservation of pump brightness by tapering output (uncoated) end of the fibre to 20 μm so that pump intensity would be in the region of $10^6$ $W/cm^2$. 1 m of Yb-doped fibre with pump absorption 10 dB/m at 915 nm is wrapped around a silica tube with 3 cm diameter. The fibre outer diameter is 120 μm and doped core diameter is 10 μm. The 975 nm laser threshold is estimated to be in the region of 1.2-1.5 W, slope efficiency in the region of 80%, and output power in the range of 1-1.5 W with one pump diode. Increasing number of pump diodes can scale up the output power.

There is given below the following advantages of coiled amplifying devices:
i. NA=1 suggests OD=65 μm for a 1 kW of pump (actually, NA>1 for an air-clad fibre);
ii. Fibre with OD=1 mm is able to handle 4 kW of pump;
iii. Structure similar to that shown in FIG. 8 can accept virtually unlimited amount of power (more than 10 kW);
iv. Insofar as this is an all glass structure, preferably based on silica glass only, this type of fibre lasers does not suffer from thermal problems associated with pump absorption and thermally non-matching materials (glass and silicone rubber, for example);
v. This type of fibre structure offer better pump absorption due to larger NA and non-azimuthally symmetrical cross section;
vi. Pump power can be delivered to the system via dedicated pump optical fibres with OD=200 μm, NA=0.2 which then can be tapered to 50 μm (still no power loss). The use of modern adhesives can also be employed;
vii. The number of pumps is virtually unlimited since by placing pump optical fibres at different azimuthal positions one can excite different modes—so there is no pump leakage at entrance points of adjacent pumps;
viii. This system offers protection against pump diode failure;
ix. Pump redundancy capability and flexibility in the range of output power make this type of fibre amplifier excellent candidate for leading amplifier for DWDM systems and satellite communications;

x. Output power obtainable from this type of fibre lasers/amplifiers can be well beyond 100 W.

Example VIII

Figure 58:
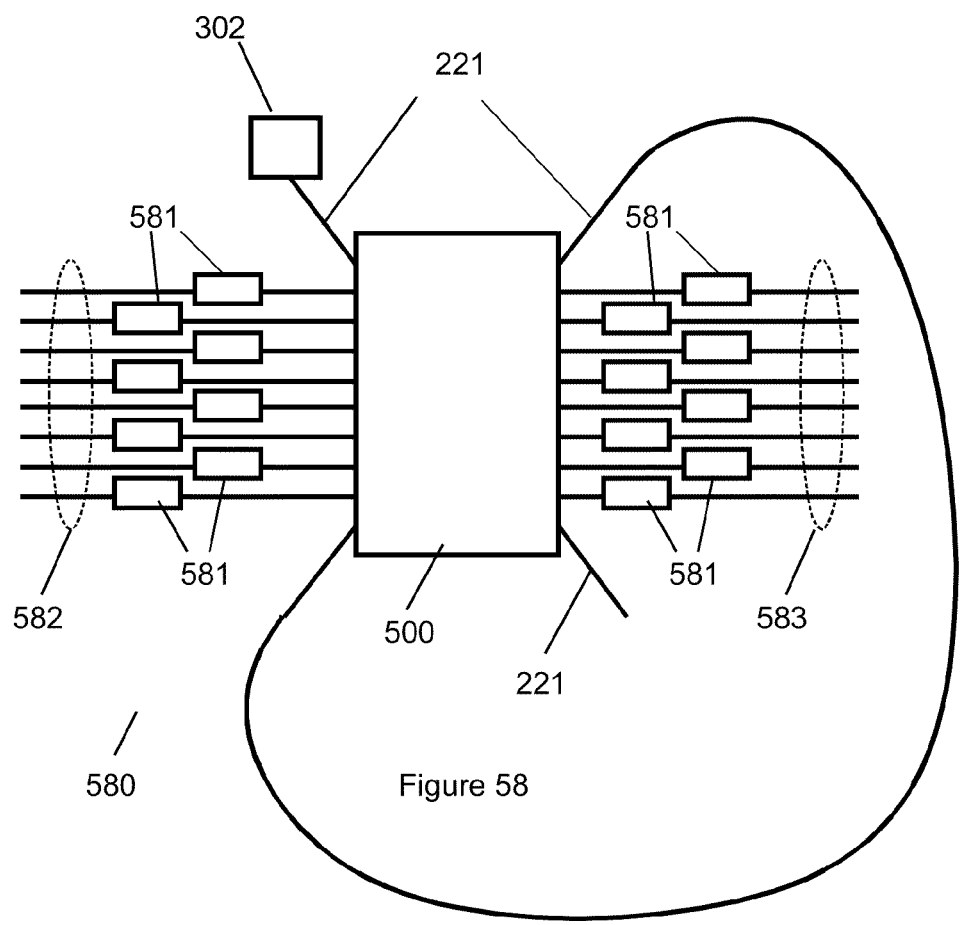
FIG. 58 depicts an amplifier according to the present invention.

This Example illustrates the advantages of a parallel optical amplifier 580 shown in FIG. 58. The parallel optical amplifier 580 is a preferred embodiment of the parallel amplifier 500 that includes optical isolators 581, input fibres 582 and output fibres 583. The Example demonstrates drastically increased amplification capacity compared to the prior art in a compact, low-cost configuration.

The amplifier 580 has eight independent ports (or amplifying channels) that provide independent amplification, each port comprising the input fibre 582 connected to the isolator 583, connected to the amplifier 500, connected to another one of the isolators 582 that connects to the output fibre 583. Thus, the amplifier 580 can replace eight single-port amplifiers and bring down the amplifier count in a large system by nearly an order of magnitude.

Furthermore, as a result of the abundance of amplifier capacity, the amplifier 580 can be configured in different ways to fulfill different roles. This Example demonstrates cascading of ports to increase output power and bandwidth, as well as independent amplification of eight different wavelength channels.

The Example is based on an optical fibre arrangement that comprises eight Er/Yb co-doped amplifying optical fibres for signal amplification and two pump optical fibres arranged in such a way that pump power launched into one of the pump optical fibres crosses into all eight amplifying optical fibres via evanescent field coupling.

Each of the amplifier optical fibres 282 has a 100 μm cladding and a 10 μm core. The pump optical fibres 281 have a diameter of 125 μm. Fibres coming out of the amplifier 500 were coated with UV curable secondary coating. Each end of the amplifying optical fibres 282 was then spliced to a different one of the optical isolators 581 so that the amplifier 580 can be considered as a set of eight independent fibre amplifiers.

The pump source 302 was provided by a module comprising six broad stripe 915 nm laser diodes coupled into a single 100 μm core, 0.22 NA multimode optical fibre. The pump module had built-in laser diode driver and control electronics in a compact package. The pump module can provide up to 8 W of pump power. The pump absorption of the amplifying optical fibre 282 at this wavelength was approximately 5 dB/m so that the length of each amplifier fibre was below 2 m.

The pump optical source 320 was connected to one end of a single pump optical fibre 282. In this Example, the unabsorbed pump power was re-injected into the amplifier 500 by connecting the pump optical fibres 281 as shown.

The electrical current for the pump laser diodes was set at approximately 70% of its maximum value. This protected the amplifier 580 against diode failure: one or even two failed diodes can be compensated for by a larger pump current to restore the pre-set output power of the system.

Figure 59:
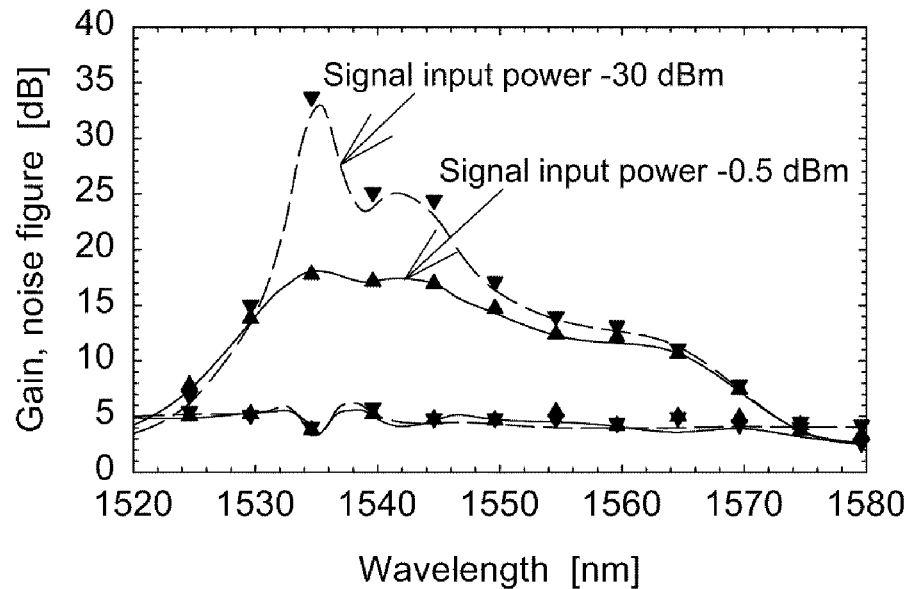
FIGS. 59 to 62 depict performance results measured on an amplifier according to the present invention.

FIG. 59 depicts the spectral dependence of signal gain for two arbitrary amplifying channels. The gain curves for the other six channels were similar. The results demonstrate nearly identical performance of two independent amplifiers.

However, the saturation output power from each of the eight amplifiers varied from 15-18 dBm. The variation is caused by non-uniform pump power distribution between individual amplifying optical fibres. The uniformity can be improved by further developments of the system.

Figure 60:
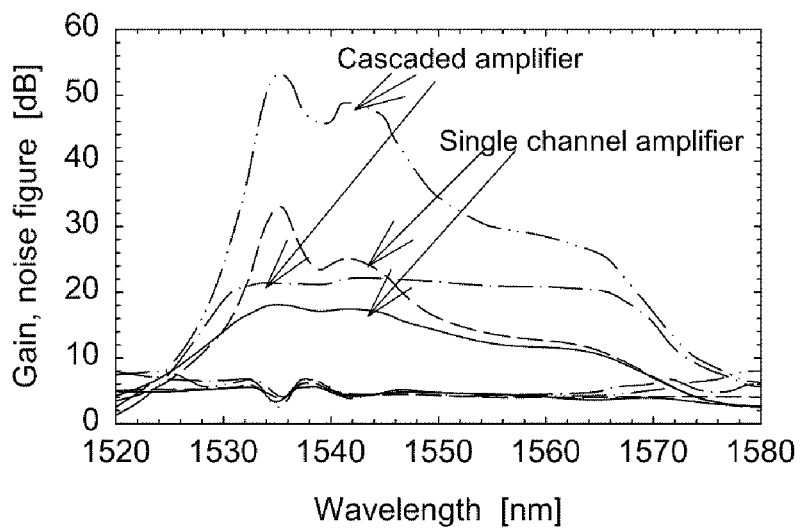

FIG. 60 shows the noise figure. All eight amplifying channels offer a 1530-1570 nm gain bandwidth with noise figure below 5 dB. This is very close to data for conventional, core-pumped amplifiers. The total output power from the amplifier 580 is almost an order of magnitude higher.

The amplifier configuration allows two or more fibre amplifying channels to be cascaded (as described with reference to FIGS. 34 to 36) in order to increase the gain or saturated output power, while at the same time retaining the low noise figure. FIG. 60 shows gain and noise figure for three cascaded amplifiers. The small signal gain exceeds 50 dB with a noise figure still below 5 dB. The high gain and flexibility of the amplifier assembly allows, for example, for lossy elements like dispersion compensators or switches to be inserted between individual amplifiers, for added functionality without noise or power penalty.

The performance of the amplifying channels was also tested with an array of eight distributed feedback DFB fibre lasers with a 50 GHz signal spacing. The DFB fibre lasers were individually pumped and the output power was deliberately made unequal with more than 10 dB power variations. FIG. 61 shows the output power in the individual wavelength channels 611, 612, 613, 614, 615, 616, 617, 618. The results demonstrate high contrast output spectra with significant power equalization.

Figure 62:
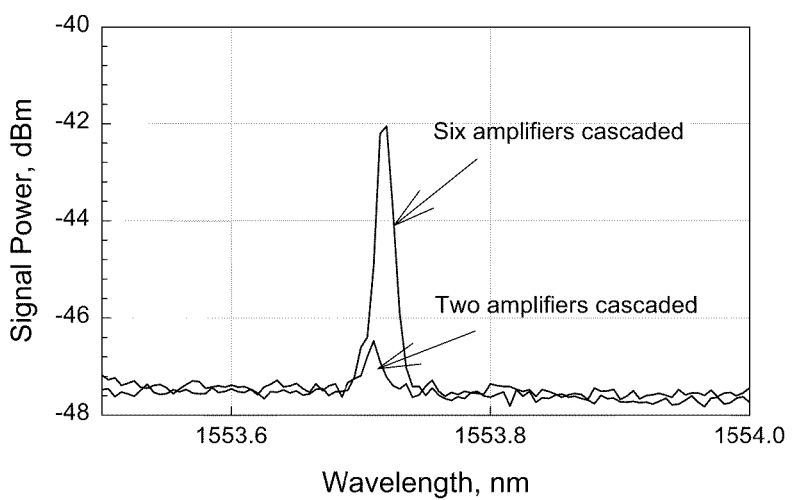

Another way of using the amplifier 580 is for amplification of wavelength division multiplexed WDM signals, with the channels demultiplexed and then amplified in separate amplifying optical fibres. As seen in FIG. 62, because of the use of a dedicated amplifying optical fibre for each WDM channel, the amplifier's inter-channel cross-talk is very low. The cross-talk was measurable only when three amplifiers were cascaded and is below −50 dB.

This Example has demonstrated a zero cross-talk parallel optical amplifier with small signal gain above 30 dB and noise figure below 5 dB. The system comprises eight, parallel, amplifying optical fibres pumped by a compact module with a built-in pump redundancy scheme. The amplifying optical fibres have a length of 1.5 m, possess low cross-talk and low nonlinear signal distortion. The system can be reconfigured by cascading two or more amplifiers in order to increase gain or saturated power, retaining at the same time a very-low noise figure. This parallel amplifier is particularly useful for application in wavelength-division-multiplexed telecommunication networks.

While the above invention has been described in language more or less specific as to structural and methodical features, it is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. An amplifying optical device to provide optical amplification, comprising:
    at least one pump adapted to supply pump radiation; at least one pump optical fibre section;
    at least one amplifying optical fibre section comprising a core and a cladding; and wherein:
    the pump optical fibre section and the amplifying optical fibre section are made substantially from glass;

a portion of the pump optical fibre section is separated from the amplifying optical fibre section, and is connected to the pump;

the pump optical fibre section and the amplifying optical fibre section are coated with a common coating and are in optical contact with each other along at least a portion of their length;

the common coating has a refractive index which is lower than a refractive index of a cladding material of the pump optical fibre section;

the optical amplification is provided substantially by the said portion of the length in which the pump optical fibre section and the amplifying optical fibre section are coated and are in optical contact with each other, and the pump optical fibre section and the amplifying optical fibre section are in the form of an optical fibre cable.

2. An amplifying optical device according to claim 1 wherein the coating is a polymer with a first refractive index less than a second refractive index of a cladding material of both the pump optical fibre section and the amplifying optical fibre section.

3. An amplifying optical device according to claim 2 wherein the amplifying optical fibre section comprises at least one rare earth dopant selected from the group consisting of Ytterbium, Erbium, Neodymium, Praseodymium, Thulium, Samarium, Holmium, and Dysprosium, or is doped with a transition metal or semiconductor.

4. An amplifying optical device according to claim 3 wherein the pump optical fibre section has a substantially uniform refractive index across its cross-section.

5. An amplifying optical device according claim 4 wherein the pump optical fibre section has a first diameter, and in which the amplifying optical fibre section has a second diameter which is different from the first diameter.

6. An amplifying optical device according to claim 1 and comprising at least two pumps, and wherein the pump optical fibre section is disposed between the two pumps.

7. An amplifying optical device according to claim 1 and comprising a plurality of pump optical fibre sections, and wherein a portion of pump energy guided by each of the pump optical fibre sections is coupled into the amplifying optical fibre section.

8. An amplifying optical device according to claim 7 wherein the optical fibre sections are defined by ends, and the ends of at least one pair of pump optical fibre sections are connected to each other.

9. An amplifying optical device according to claim 1 and comprising a plurality of amplifying optical fibre sections that receive pump energy from the at least one pump.

10. An amplifying optical device according to claim 9 and wherein the amplifying optical fibre sections are defined by ends, and the end of the at least one amplifying optical fibre section is connected to the end of another one of the amplifying optical fibre sections.

11. An amplifying optical device according to claim 1 and further comprising at least one optical element coupled along the length of the amplifying optical fibre section, the optical element being selected from the group consisting of a polariser, an isolator, a circulator, a grating, an optical fibre Bragg grating, a long-period grating, an acousto-optic modulator, an acousto-optic tuneable filter, an optical filter, a Kerr cell, a Pockels cell, a dispersive element, a non-linear dispersive element, an optical switch, a phase modulator, a Lithium Niobate modulator, and an optical crystal.

12. An amplifying optical device according to claim 11 and wherein the grating is selected from the group consisting of a gain-flattened grating, a dispersion compensating grating, and a gain-flattened, dispersion compensating grating.

13. An amplifying optical device according to claim 9 and comprising at least one input fibre and a first multiplexer connected to the input fibre, and wherein at least one of the amplifying optical fibre sections is connected to the first multiplexer.

14. An amplifying optical device according to claim 13 and further comprising a coupler and at least one output port connected to the coupler, and wherein at least one of the amplifying optical fibre sections is connected to the coupler.

15. An amplifying optical device according to claim 13 and wherein the first multiplexer is a wavelength division multiplexer.

16. An amplifying optical device according to claim 13 and wherein in use signals from individual wavelength channels input to the amplifying optical device are connected to different ones of the amplifying optical fibre sections.

17. An amplifying apparatus comprising a plurality of amplifying optical devices according to claim 13 and further comprising a second multiplexer connected to each first multiplexer.

18. An amplifying apparatus according to claim 17 and further comprising an optical device, and wherein the optical device is connected to the amplifying optical devices, and the optical device is selected from the group consisting of an optical router, an add-drop multiplexer, an add multiplexer, a drop multiplexer, an optical switch, a polariser, an isolator, a circulator, a grating, an optical fibre Bragg grating, a long-period grating, an acousto-optic modulator, an acousto-optic tuneable filter, an optical filter, a Kerr cell, a Pockels cell, a dispersive element, a non-linear dispersive element, an optical switch, a phase modulator, a Lithium Niobate modulator, and an optical crystal.

19. An amplifying apparatus according to claim 18 wherein the optical router comprises an optical switch configured such that optical signals output from one of the amplifying optical devices are routed to at least two more of the amplifying optical devices.

20. An optical fibre laser comprising an amplifying optical device according to claim 1 and further comprising an optical feedback device for promoting light generation within the laser.

21. An optical telecommunications network comprising the amplifying device of claim 13.

* * * * *